(12) United States Patent
Lee et al.

(10) Patent No.: US 6,799,170 B2
(45) Date of Patent: Sep. 28, 2004

(54) SYSTEM AND METHOD OF SEPARATING SIGNALS

(75) Inventors: Te-Won Lee, San Diego, CA (US); Michael S. Lewicki, Pittsburgh, PA (US); Terrence J. Sejnowski, Solana Beach, CA (US)

(73) Assignee: The Salk Institute for Biological Studies, La Jolla, CA (US)

( * ) Notice: Subject to any disclaimer, the term of this patent is extended or adjusted under 35 U.S.C. 154(b) by 0 days.

(21) Appl. No.: 10/202,190

(22) Filed: Jul. 22, 2002

(65) Prior Publication Data

US 2003/0061185 A1 Mar. 27, 2003

Related U.S. Application Data

(63) Continuation of application No. 09/418,099, filed on Oct. 14, 1999, now Pat. No. 6,424,960.

(51) Int. Cl.[7] .................................................. G06N 3/02
(52) U.S. Cl. ............................ 706/20; 706/22; 706/25
(58) Field of Search ........................... 382/159; 700/44, 700/48; 704/232; 706/14, 15, 16, 22, 25, 33, 44, 48

(56) References Cited

U.S. PATENT DOCUMENTS

| | | | |
|---|---|---|---|
| 4,721,958 A | | 1/1988 | Jenkin |
| 5,092,343 A | | 3/1992 | Spitzer et al. |
| 5,119,469 A | * | 6/1992 | Alkon et al. ................... 706/25 |
| 5,353,346 A | | 10/1994 | Cox et al. |
| 5,390,285 A | * | 2/1995 | Wood ............................ 706/25 |
| 5,416,888 A | * | 5/1995 | Shimokawa .................. 706/16 |
| 5,517,600 A | * | 5/1996 | Shimokawa .................. 706/15 |
| 5,566,209 A | | 10/1996 | Forssen et al. |

(List continued on next page.)

OTHER PUBLICATIONS

Cotter, N.E.; Conwell, P.R., Fixed–weight networks can learn, Neural Networks, 1990., 1990 IJCNN International Joint Conference on, Jun. 17–21, 1990, pp. 553–559 vol. 3.*

Gonzalo, C.; Tian, Q.; Fainman, Y.; Lee, S.H., Fast convergence of the backpropagation learning algorithm by using adaptive accuracy of weights, Circuits and Systems, 1992., Proceedings of the 35th Midwest Symposium on, Aug. 9–12, 1992, pp. 1221–1224*

Cotter, N.E.; Conwell, P.R., Learning algorithms and fixed dynamics, Neural Networks, 1991., IJCNN–91–Seattle International Joint Conference on vol.: i , Jul. 8–14, 1991 , pp. 799–801 vol. 1.*

Geoffrey E. Hinton and Drew van Camp; Keeping the neural networks simple by minimizing the description length of the weights; Proceedings of the sixth annual ACM conference on Computational learning theory, Jul. 26–28, 1993, pp. 5–13.*

(List continued on next page.)

Primary Examiner—Wilbert L. Starks, Jr.
(74) Attorney, Agent, or Firm—Morrison & Foerster LLP

(57) ABSTRACT

A computer-implemented method and apparatus that adapts class parameters, classifies data and separates sources configured in one of multiple classes whose parameters (i.e. characteristics) are initially unknown. A mixture model is used in which the observed data is categorized into two or more mutually exclusive classes. The class parameters for each of the classes are adapted to a data set in an adaptation algorithm in which class parameters including mixing matrices and bias vectors are adapted. Each data vector is assigned to one of the learned mutually exclusive classes. The adaptation and classification algorithms can be utilized in a wide variety of applications such as speech processing, image processing, medical data processing, satellite data processing, antenna array reception, and information retrieval systems.

31 Claims, 16 Drawing Sheets

U.S. PATENT DOCUMENTS

| | | | | |
|---|---|---|---|---|
| 5,625,749 A | | 4/1997 | Goldenthal et al. | |
| 5,649,065 A | * | 7/1997 | Lo et al. | 706/22 |
| 5,664,066 A | * | 9/1997 | Sun et al. | 706/25 |
| 5,706,391 A | | 1/1998 | Yamada et al. | |
| 5,706,402 A | | 1/1998 | Bell | |
| 5,717,833 A | * | 2/1998 | Neely | 706/33 |
| 5,724,487 A | | 3/1998 | Streit | |
| 5,748,847 A | * | 5/1998 | Lo | 706/14 |
| 5,778,342 A | | 7/1998 | Erell et al. | |
| 5,790,754 A | * | 8/1998 | Mozer et al. | 704/232 |
| 5,790,758 A | | 8/1998 | Streit | |
| 5,825,646 A | * | 10/1998 | Keeler et al. | 700/44 |
| 5,841,651 A | * | 11/1998 | Fu | 700/48 |
| 5,933,806 A | | 8/1999 | Beyerlein et al. | |
| 5,963,929 A | * | 10/1999 | Lo | 706/22 |
| 5,987,444 A | * | 11/1999 | Lo | 706/25 |
| 5,999,902 A | | 12/1999 | Scahill et al. | |
| 6,002,952 A | | 12/1999 | Diab et al. | |
| 6,021,387 A | * | 2/2000 | Mozer et al. | 704/232 |
| 6,058,206 A | * | 5/2000 | Kortge | 382/159 |

OTHER PUBLICATIONS

Bell et al., "An Information–Maximisation Approach to Blind Separation and Blind Deconvolution", Neural Computation 7, pp. 1129–1159 (1995). Massachusetts Institute of Technology.

Lee et al., "Unsupervised Classification with Non–Gaussian Mixture Models Using ICA", Advances in Neural Information Processing Systems, ed. Kearns et al., pp. 508–514 (1999).

Lee et al., "ICA Mixture Models for Image Processing", Institute for Neural Computation Proceedings, $6^{th}$ Joint Symposium on Neural Computation Proceedings 9, pp. 79–86, May 22, 1999, Institute for Neural Computation, University of California, San Diego.

Lee et al., "Independent Component Analysis Using an Extended Infomax Algorithm for Mixed Subgaussian and Supergaussian Sources", Neural Computation 11, pp. 417–442 (1999), Massachusetts Institute of Technology.

Lee et al., "ICA Mixture Models for Unsupervised Classification and Automatic Context Switching", First International Workshop on Independent Component Analysis and Signal Separation, pp. 209–214 (1999), ICA '99, Aussie, France.

Lee et al., Independent Component Analysis: Theory and Applications, pp. vii–210 (Oct. 14, 1998) Kluwer Academic Publishers, Boston, MA.

Ueda et al. (2000) SMEM Algorithm for Mixture Models. Neural Comput. 12(9):2109–2128.

* cited by examiner $X_t = [X_1, X_2, X_3, X_4, X_5, X_6, X_7, X_8, X_9]$

SYSTEM AND METHOD OF SEPARATING SIGNALS

RELATED U.S. APPLICATIONS

This application is a continuation of U.S. application Ser. No. 09/418,099 filed on Oct. 14, 1999 now U.S. Pat. No. 6,424,960.

BACKGROUND OF THE INVENTION

1. Field of the Invention

The present invention generally relates to computer-implemented systems for processing data that includes mixed signals from multiple sources, and particularly to systems for adapting parameters to the data, classifying the data, and separating sources from the data.

2. Description of Related Art

Recently, blind source separation by ICA (Independent Component Analysis) has received attention because of its potential signal processing applications, such as speech enhancement, image processing, telecommunications, and medical signal processing, among others. ICA is a technique for finding a linear non-orthogonal coordinate system in multivariate data. The directions of the axes of the coordinate system are determined by the data's second- and higher-order statistics. The separation is "blind" because the source signals are observed only as unknown linear mixtures of signals from multiple sensors, and the characteristic parameters of the source signals are unknown except that the sources are assumed to be independent. In other words, both the source signals and the way the signals are mixed is unknown. The goal of ICA is to learn the parameters and recover the independent sources (i.e., separate the independent sources) given only the unknown linear mixtures of the independent source signals as observed by the sensors. In contrast to correlation-based transformations such as principal component analysis (PCA), the ICA technique adapts a matrix to linearly transform the data and reduce the statistical dependencies of the source signals, attempting to make the source signals as independent as possible. ICA has proven a useful tool for finding structure in data, and has been successfully applied to processing real world data, including separating mixed speech signals and removing artifacts from EEG recordings.

U.S. Pat. No. 5,706,402, entitled "Blind Signal Processing System Employing Information Maximization to Recover Unknown Signals Through Unsupervised Minimization of Output Redundancy", issued to Bell on Jan. 6, 1998, discloses an unsupervised learning algorithm based on entropy maximization in a single-layer feedforward neural network. In the ICA algorithm disclosed by Bell, an unsupervised learning procedure is used to solve the blind signal processing problem by maximizing joint output entropy through gradient ascent to minimize mutual information in the outputs. In that learned process, a plurality of scaling weights and bias weights are repeatedly adjusted to generate scaling and bias terms that are used to separate the sources. The algorithm disclosed by Bell separates sources that have supergaussian distributions, which can be described as sharply peaked probability density functions (pdfs) with heavy tails. Bell does not disclose how to separate sources that have negative kurtosis (e.g., uniform distribution).

In many real world situations the ICA algorithm cannot be effectively used because the sources are required to be independent (e.g. stationary), which means that the mixture parameters must be identical throughout the entire data set. If the sources become non-stationary at some point then the mixture parameters change, and the ICA algorithm will not operate properly. For example, in the classic cocktail party example where there are several voice sources, ICA will not operate if one of the sources has moved at some time during data collection because the source's movement changes the mixing parameters. In summary, the ICA requirement that the sources be stationary greatly limits the usefulness of the ICA algorithm to find structure in data.

SUMMARY OF THE INVENTION

A mixture model is implemented in which the observed data is categorized into two or more mutually exclusive classes, each class being modeled with a mixture of independent components. The multiple class model allows the sources to become non-stationary. A computer-implemented method and apparatus is disclosed that adapts multiple class parameters in an adaptation algorithm for a plurality of classes whose parameters (i.e. characteristics) are initially unknown. In the adaptation algorithm, an iterative process is used to define multiple classes for a data set, each class having a set of mixing parameters including a mixing matrix $A_k$ and a bias vector $b_k$. After the adaptation algorithm has completed operations, the class parameters and the class probabilities for each data vector are known, and data is then assigned to one of the learned mutually exclusive classes. The sources can now be separated using the source vectors calculated during the adaptation algorithm. Advantageously, the sources are not required to be stationary throughout the data set, and therefore the system can classify data in a dynamic environment where the mixing parameters change without notice and in an unknown manner. The system can be used in a wide variety of applications such as speech processing, image processing, medical data processing, satellite data processing, antenna array reception, and information retrieval systems. Furthermore, the adaptation algorithm described herein is implemented in one embodiment using an extended infomax ICA algorithm, which provides a way to separate sources that have a non-Gaussian (e.g., platykurtic or leptokurtic) structure.

A computer-implemented method is described that adapts class parameters for a plurality of classes and classifies a plurality of data vectors having N elements that represent a linear mixture of source signals into said classes. The method includes receiving a plurality of data vectors from data index $t=1$ to $t=T$, initializing parameters for each class, including the number of classes, the probability that a random data vector will be in class k, the mixing matrix for each class, and the bias vector for each class. In a main adaptation loop, for each data vector from data index $t=1$ to $t=T$, steps are performed to adapting the class parameters including the mixing matrices and bias vectors for each class. The main adaptation loop is repeated a plurality of iterations while observing a learning rate at each subsequent iteration, and after observing convergence of said learning rate, then assigning each data vector to one of said classes. The source vectors, which are calculated for each data vector and each class, can then be used to separate source signals in each of said classes. In one embodiment, the mixing matrices are adapted using an extended infomax ICA algorithm, so that both sub-Gaussian and super-Gaussian sources can be separated.

A method is also described in which a plurality of data vectors are classified using previously adapted class parameters. The class probability for each class is calculated and each data vector is assigned to one of the previously adapted class. This classification algorithm can be used, for example to compress images or to search an image for a particular structure or particular types of structure.

The method can be used in a variety of signal processing applications to find structure in data, such as image processing, speech recognition, and medical data processing. Other uses used include image compression, speech compression, and classification of images, speech, and sound.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION

This invention is described in the following description with reference to the Figures, in which like numbers represent the same or similar elements.

The following symbols are used herein to represent the certain quantities and variables, and in accordance with conventional usage, a matrix is represented by an uppercase letter with boldface type, and a vector is represented by a lowercase letter with boldface type.

Table of Symbols

| | |
|---|---|
| $A_k$ | mixing matrix with elements $a_{ij}$ for class k |
| $A^{-1}$ | filter matrix, inverse of A |
| $b_k$ | bias vector for class k |
| $\theta_k$ | parameters for class k |
| $\Theta$ | parameters for all classes |
| J | Jacobian matrix |
| k | class index |
| K | number of classes |
| $q_k$ | switching moment vectors for sub- and super-Gaussian densities |
| $Q_k$ | diagonal matrix with elements of the vector $q_k$ |
| M | number of sources |
| n | mixture index |
| N | number of sensors (mixtures) |
| p(s) | probability density function |
| $s_t$ | Independent source signal vectors |
| t | data index, (e.g. time or position) |
| T | total number of data vectors in the data set |
| W | weight matrix |
| $x_t$ | observed data vector (data point) at data index t |
| X | observed data vectors $X = [x_1, \ldots, x_t, \ldots, x_T]^T$ (whole data set) |

In some instances, reference may be made to "basis functions" or "basis vectors", which are defined by the columns of the mixing matrix. In other words, the basis functions or vectors for a class are defined by the column vectors of the mixing matrix for that class.

Overview of a Data Set

Figure 1:
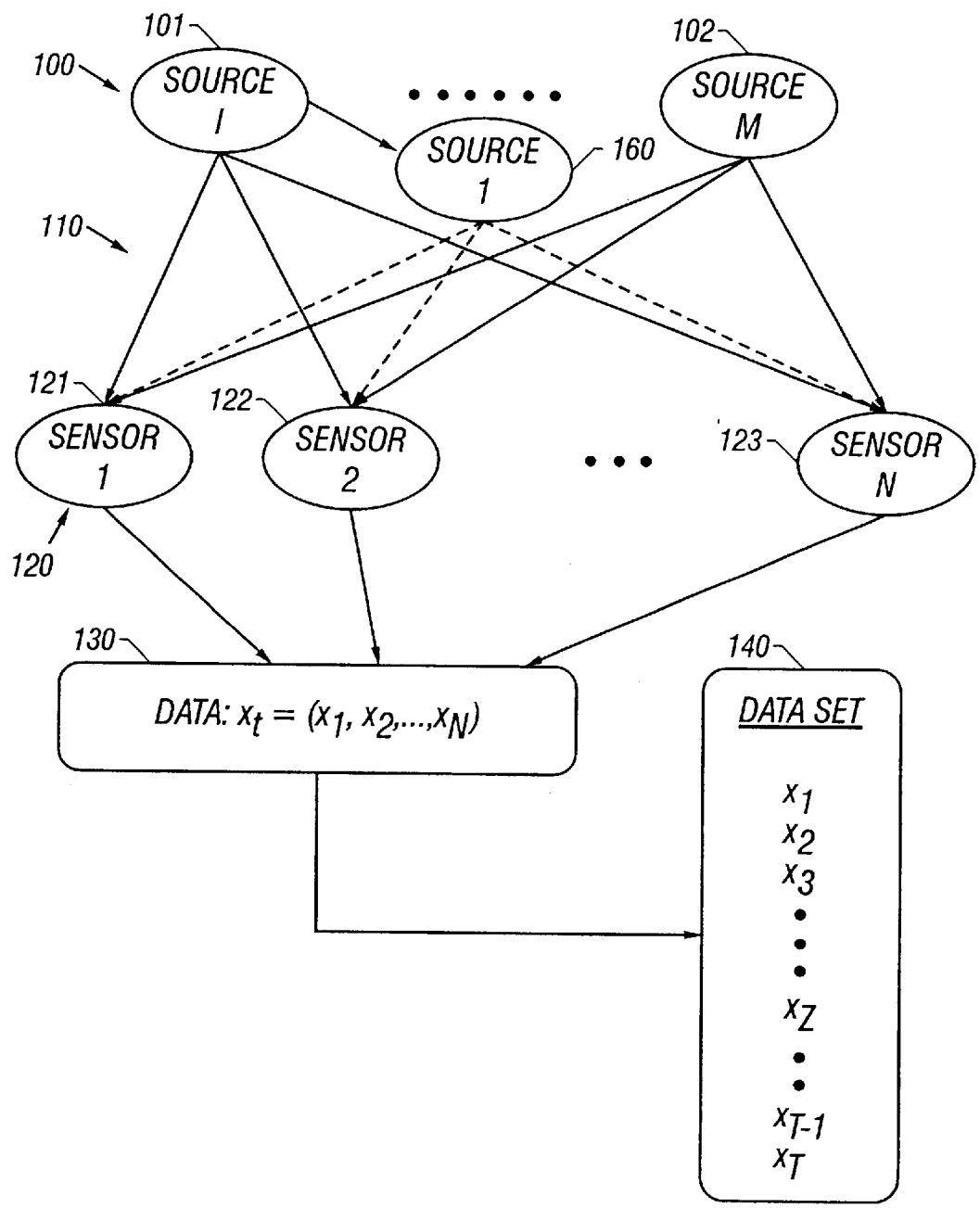
FIG. 1 is a diagram that shows a plurality of M sources that generate signals, a plurality of N sensors that receive mixed signal, a data vector whose element are defined by the mixed signals from the sensors, and a data set defined by a collection of data vectors.

Reference is now made to FIG. 1 which shows a plurality of M sources 100, including a first source 101, a second (Mth) source 102, and a number of sources in-between. The sources 100 provide signals shown generally at 110 to a plurality of N sensors 120, including a first sensor 121, a second sensor 122, a third (Nth) sensor 123, and a number of sensors in-between that depend upon the embodiment. From FIG. 1 it can be seen that the sensors receive a linear combination (mixture) of the signals from the sources. The number of sensors (N) is assumed to be greater than or equal to the number of sources (M), i.e. $N \geq M$. Subject to this restriction, there is no upper limit on the number of sources M and sensors N, and accordingly M and N are constrained only by practical concerns.

The actual number of sources may be unknown, and in such circumstances it may be useful to estimate the number of sources. If the number of sensors is greater than or equal to the number of sources, then the ICA algorithm will work in the adaptation process described herein. However if the number of sensors is less than the number of sources, then an alternative to ICA must be used. One way of estimating the number of sources is to compute the correlation matrix of the data set X. The rank of the correlation matrix gives an estimate of the number of actual sources in the data.

The parameters (e.g. characteristics) of the mixture and the sources are initially unknown. The sources 100 are assumed to be mutually independent, and each of their probability distributions is assumed to be non-Gaussian. The sources and sensors may comprise many different combinations and types. For example, each of the sources may be a person speaking in a room, in which case the signals comprise voices provided to N microphone sensors situated in different locations around the room. All the voices are received by each microphone in the room, and accordingly each microphone outputs a linear combination (a mixture) of all the voices. The data from each of the microphones is collected in a data vector x, shown at 130 that has N elements, each element representing data from its corresponding sensor. In other words the first element x, includes data from the first sensor, the second element $x_2$ includes data from the second sensor, and so forth. In the microphone example, the data vectors may be collected as a series of digital samples at a rate (e.g. 8 kHz) sufficient to recover the sources.

A series of observations of the sources are observed by the sensors from t=1 to t=T. Typically the variable t represents time, and accordingly the series of measurements typically represent a time sequence of observations. The observed data vectors are collected in a data set 140, which includes a group of all observed data vectors from $x_1$ to $X_T$. The data log may reside in the memory of a computer, or any other suitable memory location from which it can be supplied to a computer for processing. Before processing, the data vectors must be in digital form, and therefore if the information from the sensors is not already in digital form, the data must be digitized by any suitable system. For example if the microphones receive analog signals, these signals must processed by a audio digitizer to put the data in digital form that can be stored in a computer memory and processed.

Separation of Sources

Based upon the mixed signals received by the sensors 120, one goal in some embodiments is to separate the sources so that each source can be observed. In the above example, this means that the goal is to separate the voices so that each voice can listened to separately. In other embodiments to be described, the data set may include patches from digitized images in which the N elements include data from N pixels, or even data from a single sensor such as a microphone in which the N elements include a series of N samples over time.

If the sources are independent for all observations from t=1 to T, then an ICA (Independent Components Analysis) algorithm such as disclosed by Bell in U.S. Pat. No. 5,706,402, which is incorporated by reference herein, can be utilized to separate the sources. In the ICA algorithm disclosed by Bell, an unsupervised learning procedure is used to solve the blind signal processing problem by maximizing joint output entropy through gradient ascent to minimize mutual information in the outputs. In that learned process, a plurality of scaling weights and bias weights are repeatedly adjusted to generate scaling and bias terms that are used to separate the sources. However, the ICA algorithm disclosed by Bell is limited because the sources must be independent throughout the data set; i.e. Bell's ICA algorithm requires that the sources must be independent for all data vectors in the data log. Therefore, if one of the sources becomes dependent upon the other, or in the example above if one of the sources shifts location, such as the first sensor 101 moves to the location shown in dotted lines at 160, the mixture parameters for the signals 110 will change and Bell's ICA algorithm will not operate properly.

The algorithm described herein provides a way to classify the data vectors into one of multiple classes, thereby eliminating the assumption of source independence throughout the data set, and allowing for movements of sources and other dependencies across data vectors. However, the sources in each data vector are still assumed to be independent.

Class Characteristics (Parameters)

Each class has a plurality of different parameters in the form of a mixing matrix $A_k$, a bias vector $b_k$, and a class probability $p(C_k)$. However, because the parameters for each class are initially unknown, one goal is to determine the class characteristics (i.e. determine the parameters). The algorithm described herein learns the parameters for each class in a process that includes adapting (i.e. learning) the mixing matrix and bias vectors in an iterative process. Optionally, the class probability can also be adapted. Once adapted, each data vector is assigned to a mutually exclusive class, and the corresponding source vector calculated for the data vector and assigned class provides the desired source vector.

The characteristic parameters for each class are referenced by the variable $\theta_k$, from k=1 to K. Each class has a probability designated by $p(C_k)$, which is the probability that a random data vector will fall within the class k. The characteristics for all K classes are collectively referenced by $\Theta$. The description of the parameters for each class may vary between embodiments, but generally include mixing matrices referenced by $A_k$ and bias vectors referenced by $b_k$.

The $A_k$'s are N by M scalar matrices (called basis or mixing matrices) for the class k. N is the number of mixtures (e.g. sensors) and M is the number of sources, and it is assumed that $N \geq M$, as discussed above. The $b_k$'s are N-element bias vectors. There are a total of K mixing matrices $(A_1, \ldots, A_K)$ and K bias vectors $(b_1, \ldots, b_K)$ that are learned as described herein.

Overview of the Unsupervised Adaptation and Classification Algorithm

Figure 2:
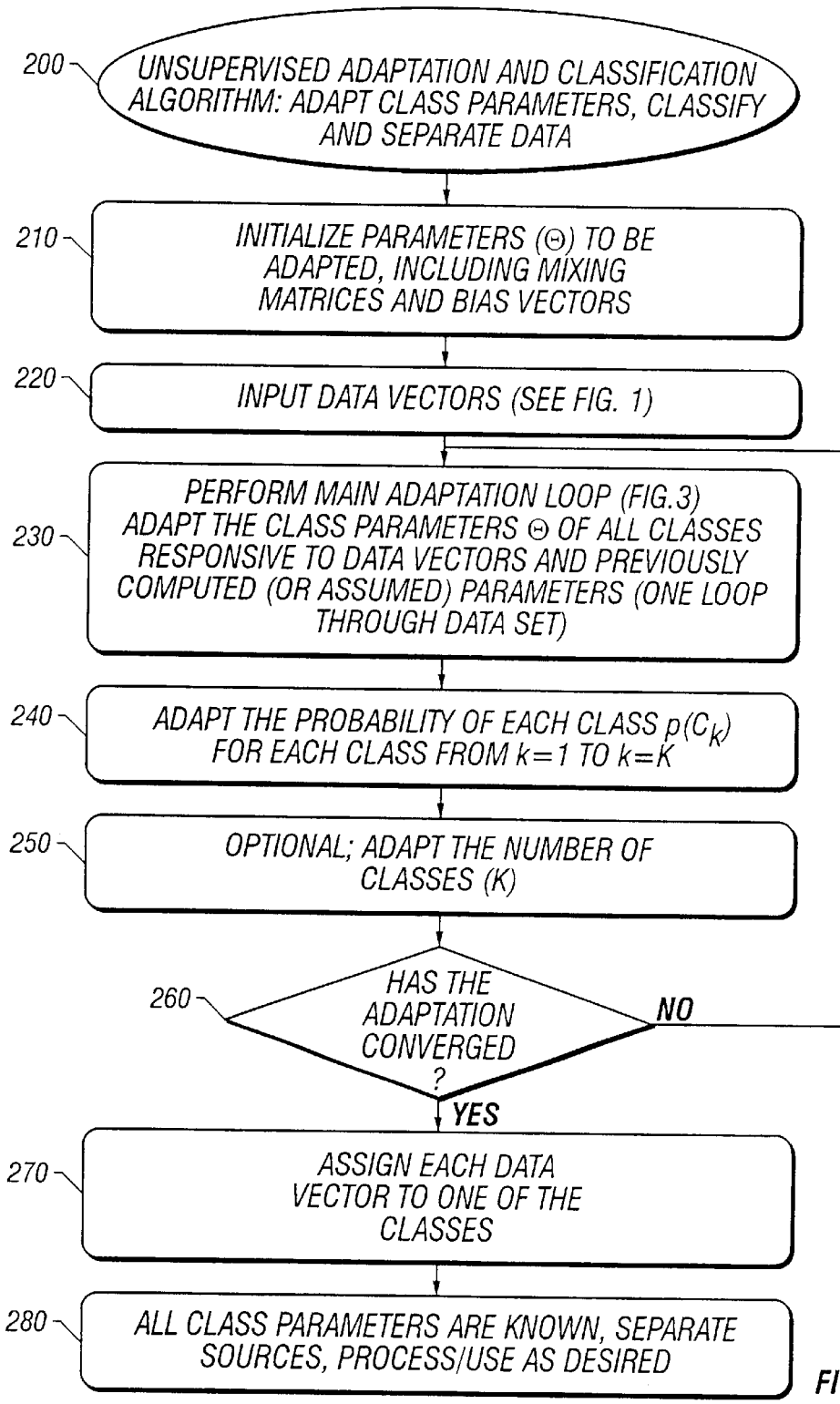
FIG. 2 is a flow chart of an unsupervised adaptation and classification algorithm that adapts class parameters, classifies the data, and separates the sources.

Reference is now made to FIG. 2, which is a top level flow chart that illustrates the unsupervised classification algorithm described herein. Due to the amount of information to be disclosed herein, many of the steps in the algorithm are referenced in FIG. 2 and then shown in detail in other Figures and discussed in detail with reference thereto. The unsupervised classification algorithm begins at a box 200 that indicates the beginning of the unsupervised classification algorithm.

In an initialization step shown at 210, parameters $\Theta$ are initialized to appropriate values. Particularly, the mixing matrices $A_k$ and bias vectors $b_k$ are initialized for each class from 1 to K. K is the total number of classes, and K is typically greater than one. The class probability for each class is typically initialized to 1/K, unless another probability is suggested.

In one example, the mixing matrices $A_k$ are set to the identity matrix, which is a matrix whose diagonal elements are one and all other elements are zero. Small random values (e.g. noise) may be added to any of the elements, which advantageously makes the mixing matrices different for each class. In this example, the bias vectors $b_k$ are set to the mean of all data vectors $x_t$ in the data set. Some small random values (e.g. noise) may be added to each of the elements of the bias vectors, which makes the bias vectors different for each class.

In some embodiments, it may be useful to also initialize switching parameter vectors $q_t$ for each data vector from t=1 to T to designate a sub- or super-Gaussian distribution. The switching vectors $q_1, \ldots q_T$ are N-element switching parameter vectors used to create a diagonal matrix in operations performed in a classification algorithm described herein. The switching parameters $q_n \in \{1, -1\}$ designate either a sub- or super-Gaussian probability distribution function (pdf).

At 220 the data vectors xt for the data set (from t=1 to t=T) are provided to the algorithm. The data index is t, and the number T is the total number of data vectors in the data set. Referring briefly to FIG. 1, it can be seen that in one embodiment each data vector $x_t$ has N elements that correspond to the number of mixtures (linear combinations), which also correspond to the number of sensors.

At 230 the main adaptation loop is performed to adapt the class parameters $\Theta$ of all the classes. This is an iterative operation performed for each data vector in the data set, and then repeated until convergence, as described in more detail below with reference to FIGS. 3, 4, 5, and 6. Generally, for each data vector the adaptation process in the main adaptation loop includes performing probabilistic calculations for each class, then adapting the class parameters based upon those calculations, and repeating these operations for each data vector. Until the algorithm converges, the main adaptation loop is repeated until the algorithm converges. Operations within the main adaptation loop will be described in detail with reference to FIGS. 3, 4, 5, and 6.

At 240, after the main adaptation loop 230 has completed one loop, the probability of each class can be adapted using a suitable learning rule. In some embodiments, this operation will be performed only after several iterations of the main loop when the learning rate slows, or at other suitable points in the process as determined by the application. One suitable learning rule, performed for each class from k=1 to k=K, is $$p(C_k) = \frac{1}{T} \sum_{t=1}^{T} p(C_k | x_t, \Theta)$$

This calculation gives the adapted class probability for each class for the next operation. The adapted class probability is then used in the next iteration of the main adaptation loop. In other embodiments, other suitable leaning rules could be used to adapt the class probabilities for each class.

At 250, the number of classes K may be adapted using a split and merge algorithm. One such algorithm, described with reference to FIG. 7 begins by assuming a certain number of classes (K), and performing a number of iterations of the main adaptation loop to calculate a first set of parameters $\Theta_1$. If all of the learned classes are sufficiently different, the assumed number of classes may adequately represent the data. However if two of the classes are very similar they may be merged. If all are different, and is possible that there may be more classes, then the number of classes (K) can be incremented, the main adaptation loop reiterated to calculate a second set of parameters $\Theta_2$, and the first and second sets of parameters compared to determine which more accurately represents the data. The adapted K value for the number of classes is then used in the next iteration of the main adaptation loop.

Another way of adapting the number of classes is to use a split and merge EM algorithm such as disclosed by Ueda, et al. in "SMEM Algorithm for Mixture Models", published in the Proceedings of the Advances in Neural Information Processing Systems 11, (Kearns et al., editors) MIT Press, Cambridge Mass. (1999), which overcomes the local maximum problem in parameter estimation of finite mixture models. In the split and merge EM algorithm described by Ueda et al., simultaneous split and merge operations are performed using a criterion that efficiently is disclosed to select the split and merge candidates that are used in the next iteration.

At 260, the results of the previous iteration are evaluated and compared with previous iterations to determine if the algorithm has converged. For example, the learning rate could be observed as the rate of change in the average likelihood of all classes:

$$p(X|\Theta) = \prod_{t=1}^{T} p(x_t|\Theta) = \prod_{t=1}^{T} \prod_{k=1}^{K} p(x_t|C_k, \theta_k) p(C_k)$$

The main adaptation loop 230 and (if implemented) the class number and probability adaptation steps 240 and 250 will be repeated until convergence. Generally, to determine convergence the algorithm tests the amount of adaptation (learning) done in the most recent iteration of the main loop. If substantial learning has occurred, the loop is repeated. Convergence can be determined when the learning rate is small and stable over a number of iterations sufficient to provide a desired level of confidence that it has converged. If, for example, the change in the average likelihood is very small over several iterations, it may be determined that the loop has converged.

Determining when an algorithm has converged is very application-specific. The initial values for the parameters can be important, and therefore they should be selected carefully on a case-by-case basis. Furthermore, as is well known, care should be taken to avoid improperly stopping on a local maximum instead of at convergence.

After the loop has converged, then each data vector is assigned to one of the classes. Particularly, for t=1 to t=T, each data vector $x_t$ is assigned to a class. Typically each data vector $x_t$ is assigned to the class with the highest probability, which is the maximum value of $p(C_k|x_t,\Theta)$ for that data vector. In some embodiments, a priori knowledge may be used to improve accuracy of the assignment process; for example, if it is known that one of the classes (e.g. a mixed conversation), is likely to extend over a number of samples (e.g. a period of time), a number of adjacent data vectors (e.g. 100 or 2000 adjacent data vectors) can be grouped together for purposes of more accurately assigning the class.

Finally, at 280, it is indicated that all class parameters are known, and each observed data vector is now classified. The source data is now separated into its various sources and available for use as desired.

Description of the Main Adaptation Loop 230

Figure 3:
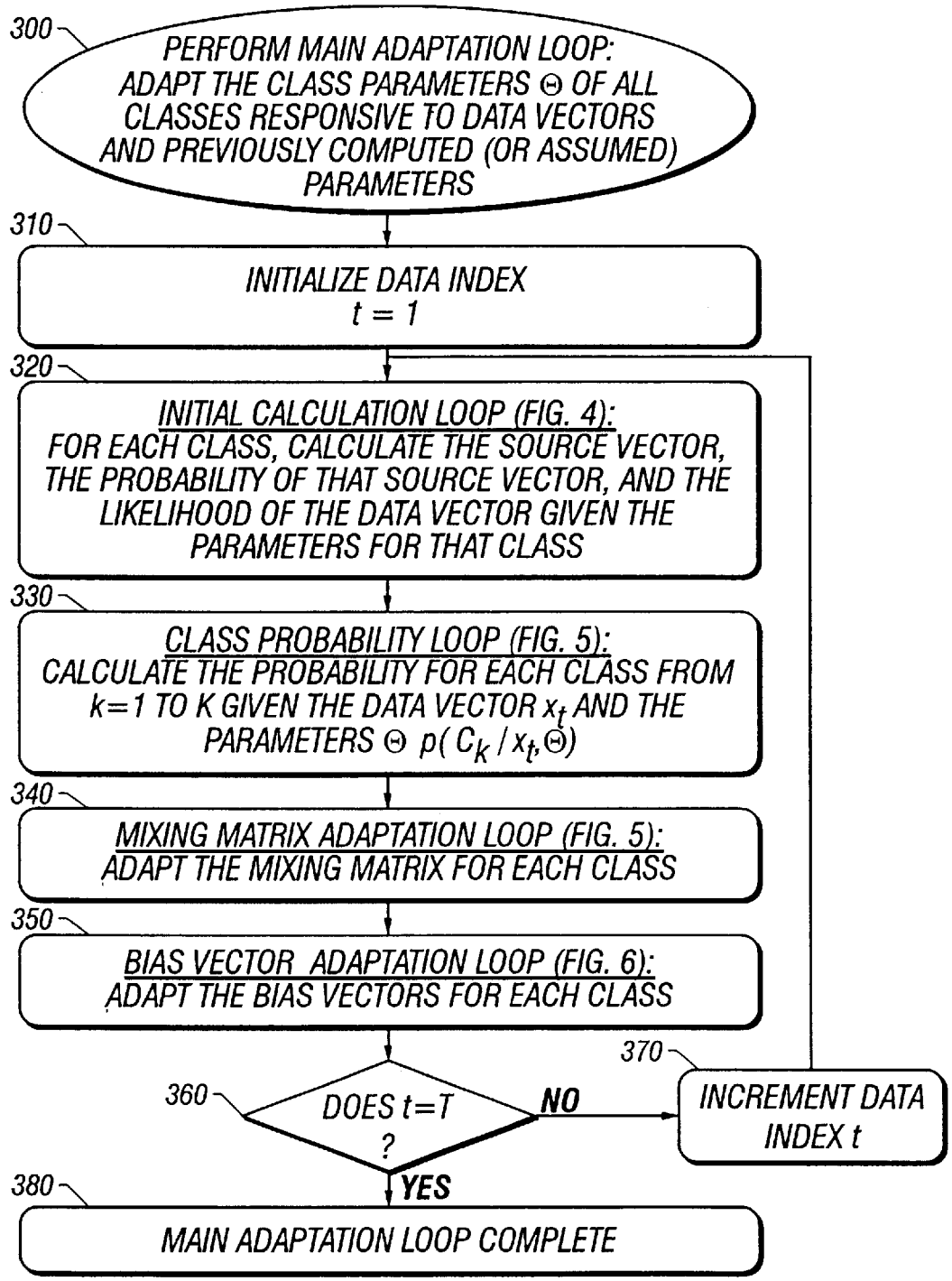
FIG. 3 is a flow chart of the main adaptation loop shown in FIG. 2.
Figure 4:
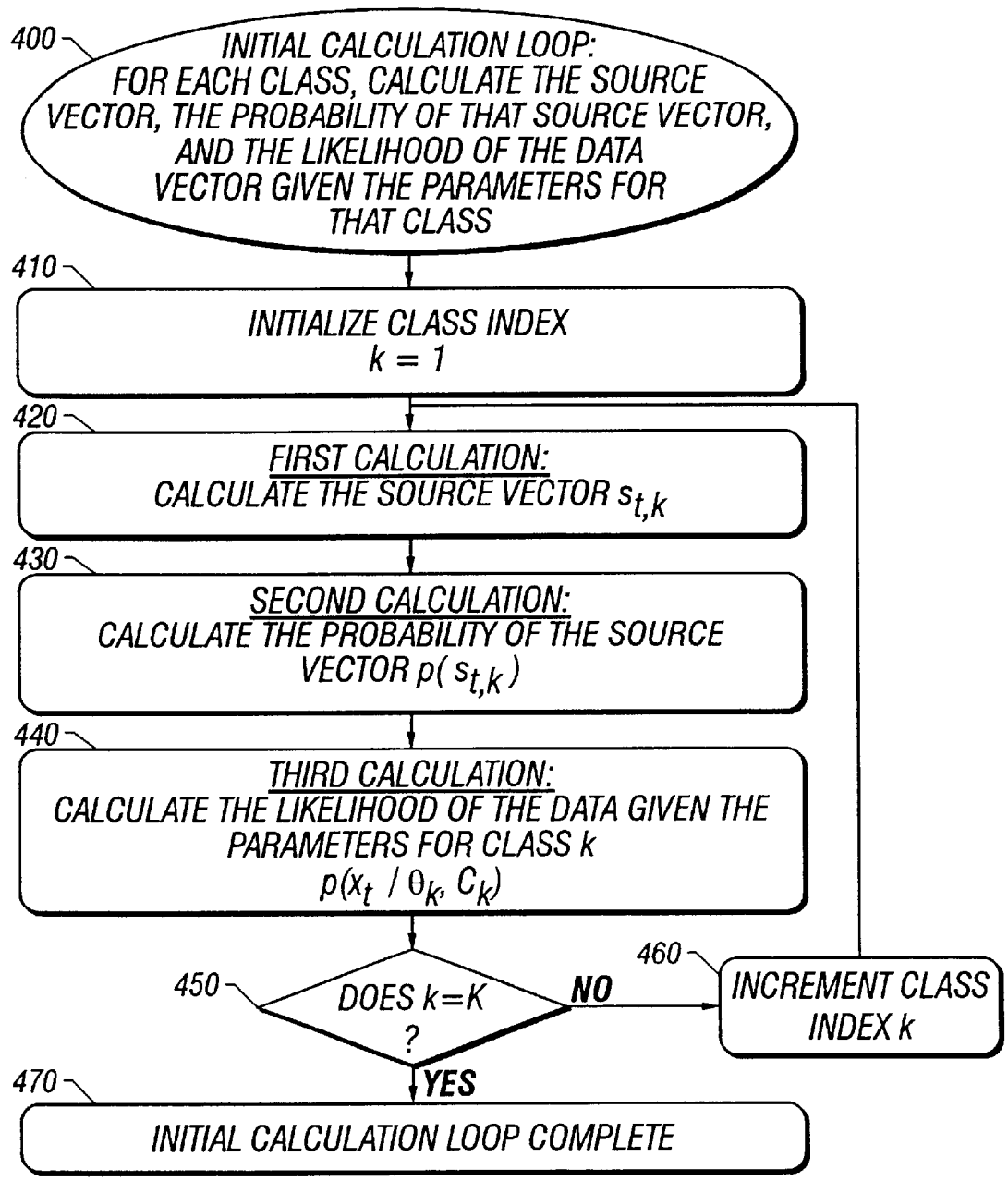
FIG. 4 is flow chart of the initial calculation loop shown in FIG. 3
Figure 5:
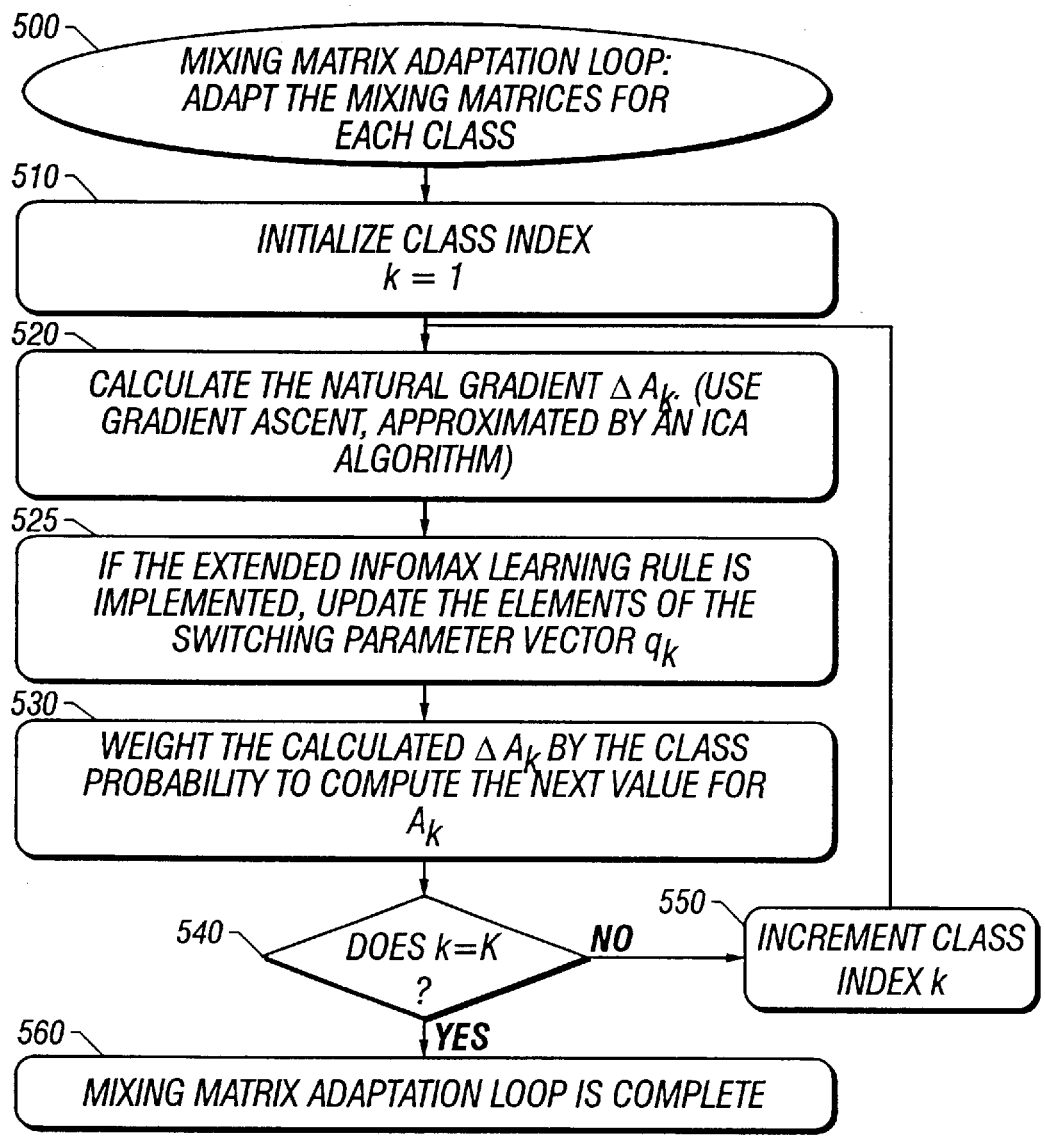
FIG. 5 is flow chart of the mixing matrix adaptation loop shown in FIG. 3
Figure 6:
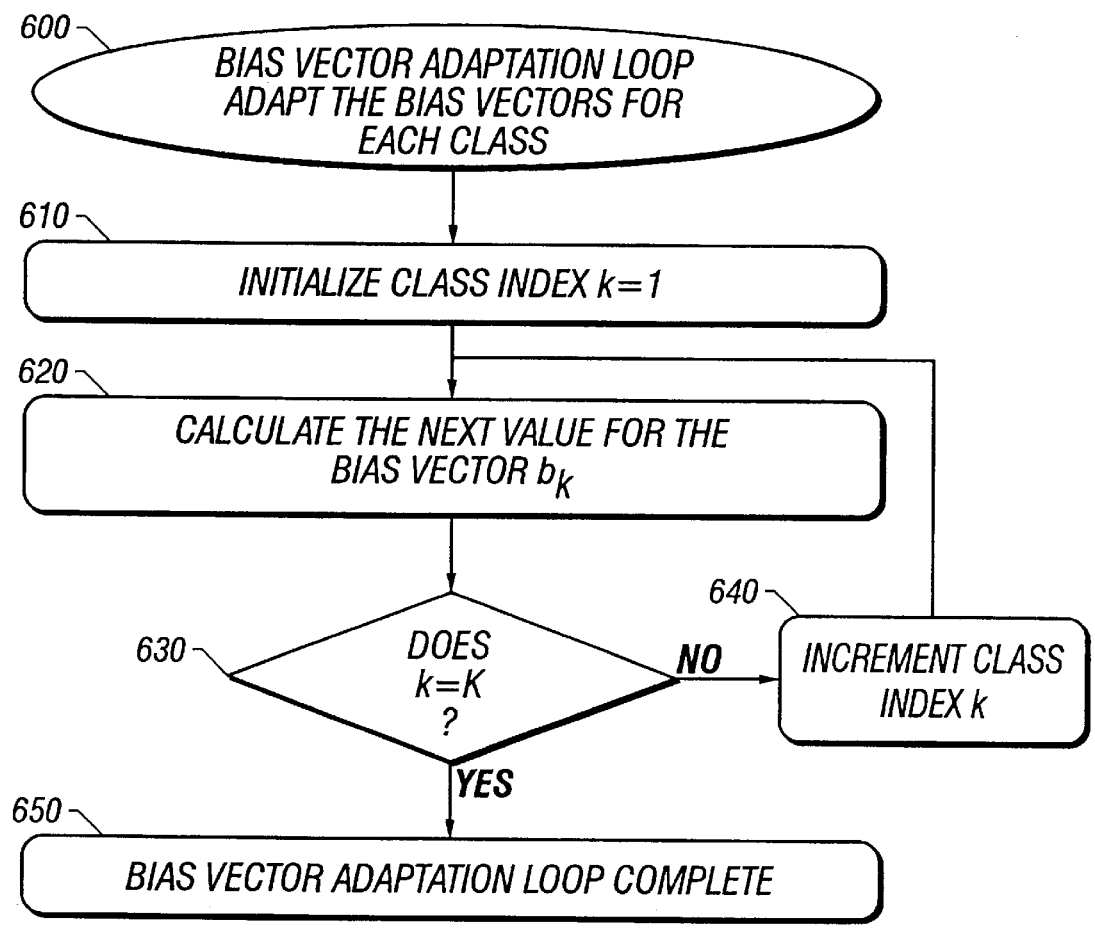
FIG. 6 is flow chart of the bias vector adaptation loop shown in FIG. 3.

Reference is now made to the flow chart of FIG. 3 in conjunction with the flow charts of FIGS. 4, 5, and 6 to describe the main adaptation loop 230 shown in FIG. 2 and described briefly with reference thereto.

Operation begins at 300, where the flow chart indicates that the main adaptation loop will adapt the class parameters $\Theta$ (for all classes) responsive to all data vectors and previously computed (or assumed) parameters.

At 310, the data index t is initialized to 1, and then operation proceeds to 320 which is the initial calculation loop, then to 330 which is the class probability calculation, then to 340 which is the mixing matrix adaptation loop, and then to 350 which is the bias vector adaptation loop. At 360, the data index is tested to determine of all of the data vectors (there are T) have been processed. If not, the data index t is incremented at 460 and the loops 320, 330, 340, and 350 are repeated. Operation in the main adaptation loop continues until each of the data vectors has been processed, at which point the data index t is equal to T, and the main adaptation loop is complete as indicated at 380.

Reference is now made to FIG. 4 to describe the initial calculation loop 320 of FIG. 3. FIG. 4 is a flow chart that begins at 400, illustrating the series of operations in the initial calculation loop. Briefly, for each class the source vector is calculated, the probability of that source vector is calculated, and the likelihood of the data vector given the parameters for that class is calculated. Although the box 320 suggests a single loop, in some embodiments, this step could be implemented in two or three separate loops each loop completing K iterations.

At 410, the class index k is initialized to 1. At 420, a first calculation calculates the source vector $s_{t,k}$ which will be used in subsequent calculations. The source vector is computed by performing the following operations:

$$s_{t,k} = A_k^{-1} \cdot (x_t - b_k)$$

At 430, a second calculation calculates the probability of the source vector using an appropriate model. One embodiment of the algorithm utilizes an extended infomax model that accommodates mixed sub- and super-Gaussian distributions, which provides greater applicability. In this model, super-Gaussian densities are approximated by a density model with a "heavier" tail than the Gaussian density; and sub-Gaussian densities are approximated by a bimodal density in accordance with an extended infomax algorithm as described by Lee et al., "Independent Component Analysis Using an Extended Infomax Algorithm for Mixed Subgaussian and Supergaussian Sources" Neural Computation 11, pp. 417–441 (1999). The log of the distribution is given by the following:

$$\log p(s_{t,k}) \propto -\sum_{n=1}^{N}\left(q_n \log[\cosh s_{t,k,n}] - \frac{s_{t,k,n}^2}{2}\right)$$

Once the log is calculated, then the loge is calculated to give the desired probability. The switching parameter $q_n$, which is selected from the set of 1 and $-1$, is determined by whether the distribution is sub-Gaussian or super-Gaussian. For super-Gaussian distributions, the switching parameter is $q_n=1$, and for sub-Gaussian distributions the switching parameter is $q_n=-1$.

As an alternative that is suitable for sparse representations (representations in which many of the source vectors are clustered around zero, the source probability can be computed using a simpler form:

$$\log p(s_{t,k}) \propto -\sum_{n=1}^{N} |s_{t,k,n}|$$

It may be noted that this simpler form does not require knowledge of the switching parameters q.

At 440, a third calculation calculates the likelihood of the data vector $x_t$ given the parameters for class k:

$$p(x_t | \theta_k, C_k) = \frac{p(s_{t,k})}{\det[A_k]}$$

This likelihood is used in subsequent calculations.

At 450, the class index is tested to determine if the operations in the loop have been completed for each of the classes. If additional classes remain to be processed, the class index is incremented as indicated at 460, and the first, second and third operations 420, 430, and 440 are repeated for each subsequent class. After all classes have been processed, the initial calculation loop is complete as indicated at 470.

Referring again to FIG. 3, the class probability loop 330 is performed by calculating, from k=1 to k=K, the following:

$$p(C_k | x_t, \Theta) = \frac{p(x_t | \theta_k, C_k) \cdot p(C_k)}{\sum_{k=1}^{K} p(x_t | \theta_k, C_k) \cdot p(C_k)}$$

The class probability loop requires all the data from the initial calculation loop 320 to calculate the sum in the denominator, and therefore cannot be calculated until after completion of the initial calculation loop.

Reference is now made to FIG. 5, which is a detailed flow chart of step 340 in FIG. 3, illustrating operations to adapt the mixing matrices for each class. The flow chart of FIG. 5 begins at 500, and at 510 the class index k is initialized to 1. An appropriate adaptation algorithm is used, such as the gradient ascent-based algorithm disclosed by Bell et al. U.S. Pat. No. 5,706,402, which is incorporated by reference herein. The particular adaptation described herein includes an extension of Bell's algorithm in which the natural gradient is used as disclosed by Amari et al., "A New Learning Algorithm for Blind Signal Separation", *Advances in Neural Information Processing Systems* 8, pp. 757–763 (1996) and also disclosed by S. Amari, "Natural Gradient Works Efficiently in Learning", *Neural Computation*, Vol. 10 No. 2, pp. 251–276 (1998). Particularly, the natural gradient is also used in the extended infomax ICA algorithm discussed above with reference to step 430, which is able to blindly separate mixed sources with sub- and super-Gaussian distributions. However, in other embodiments other rules for adapting the mixing matrices could be used.

At 520, the gradient $\Delta A_k$ is used to adapt the mixing matrix for class k:

$$\Delta A_k \propto \frac{\partial}{\partial A_k} \log p(x_t | \Theta) = p(C_k | x_t, \Theta) \frac{\partial}{\partial A_k} \log p(x_t | C_k, \theta_k)$$

The preceding gradient can be approximated using an ICA algorithm like the following extended infomax ICA learning rule, which applies generally to sub- and super-Gaussian source distributions, and also includes the natural gradient:

$$\Delta A_k \propto -p(C_k|x_t,\Theta)A_k[I-Q_k \tan h(s_k)s_k^T - s_k s_k^T]$$

where $Q_k$ is an N-dimensional diagonal matrix whose switching parameters are $q_n$, specifically, $q_n=1$ for super-Gaussian pdfs and $q_n=-1$ for sub-Gaussian pdfs.

In alternative embodiments, the gradient can also be summed over multiple data points, which is a technique that can be used to optimize the convergence speed.

When only sparse representations are needed, a Laplacian prior $(p(s) \propto \exp(-|s|))$ can be used to adapt the matrix, which advantageously eliminates the need for the switching parameters, and also simplifies the infomax learning rule described herein:

$$\Delta A_k \propto -p(C_k|x_t,\Theta)A_k[I-sign(s_k)s_k^T]$$

As an additional advantage, this simplified learning rule simplifies calculations for $p(s_{t,k})$, as described above.

At 525, if the extended infomax ICA learning rule has been implemented, the switching parameter vector $q_t$ is adapted in any suitable manner. For example, the following learning rule can be used to update the N elements of the switching parameter vector, from n=1 to n=N:

$$q_{k,n}=sign(E\{sec\ h^2(s_{k,n})\}E\{s_{k,n}^2\}-E\{[\tan h(s_{k,n})]_{k,n}\}$$

At 530, the new mixing matrix $A_k$ is calculated by weighting the natural gradient $\Delta A_k$ by the class probability:

$$A_k = p(C_k|x_t,\Theta) \cdot \Delta A_k$$

At 540, the class index is tested to determine if the mixing matrices for each of the classes have been adapted. If one or more additional classes remain to be adapted, the class index is incremented as indicated at 550, and the adaptation operations 520, 525, and 530 are repeated for each additional class. After all classes have been adapted, the mixing matrix adaptation loop is complete, as indicated at 560.

Reference is now made to FIG. 6, which is a detailed flow chart of step 350 of FIG. 3 that illustrates operations to adapt the bias vectors for each class k. The adaptation described below is based upon an approximate EM (Estimated Maximum) learning rule to obtain the next value of the bias vector. However, in other embodiments other rules for adapting the bias vectors could be used.

The flow chart of FIG. 6 begins at 600, and at 610 the class index k is initialized to 1. At 620, the next value for the bias vector is calculated. An approximate EM update rule is:

$$b_k = \frac{\sum_{t=1}^{T} x_t p(C_k | x_t, \Theta)}{\sum_{t=1}^{T} p(C_k | x_t, \Theta)}$$

This rule provides the value of the bias vector $b_k$ that will be used in the next iteration of the main adaptation loop.

At 630, the class index is tested to determine if the bias vectors for each of the classes have been adapted. If one or more additional bias vectors remain to be adapted, the class index is incremented as indicated at 640, and the adaptation operations 620 are repeated for each additional class. After all classes have been adapted, the bias vector adaptation loop is complete, as indicated at 650.

Figure 7:
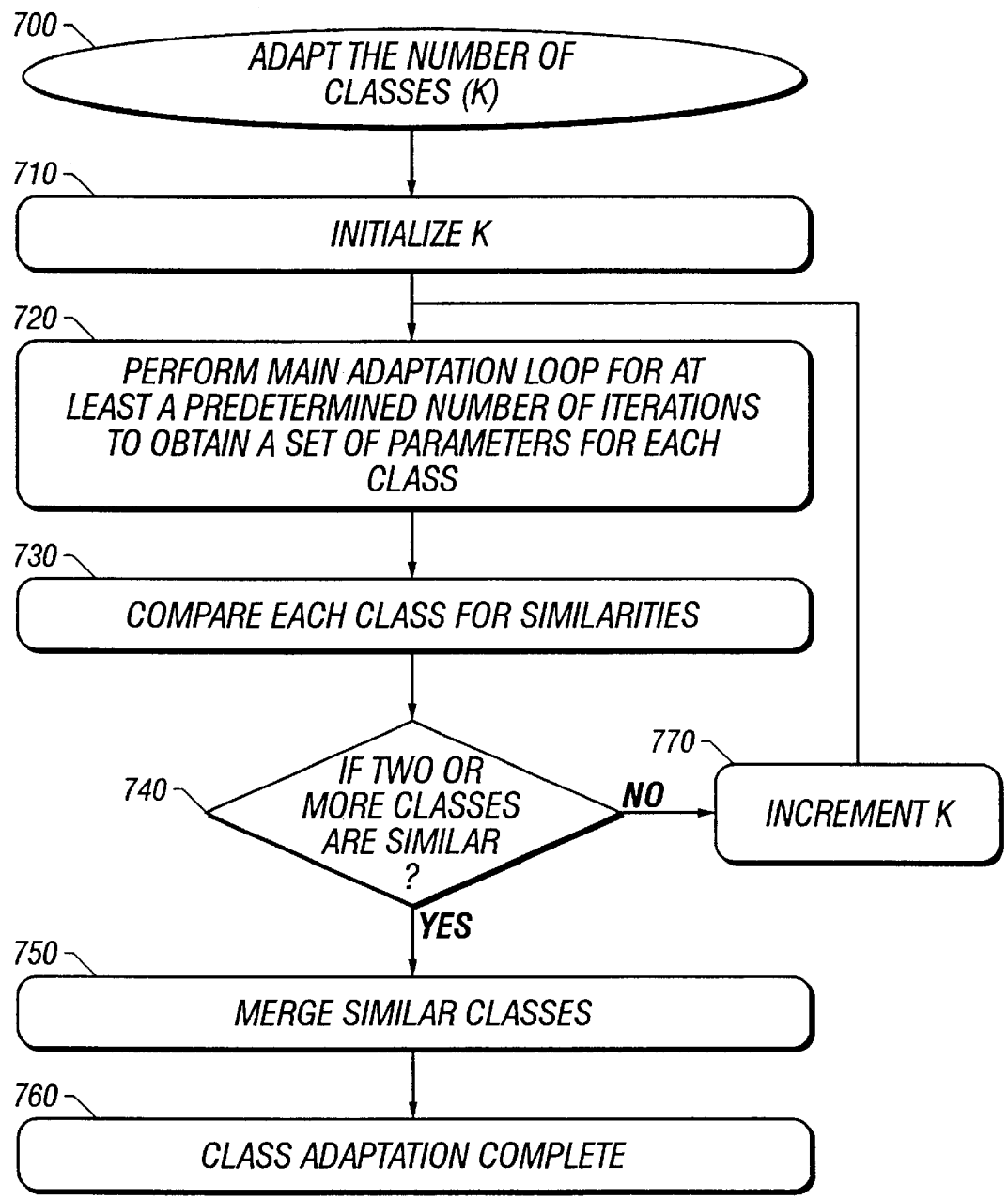
FIG. 7 is flow chart of operations in the step to adapt number of classes shown in FIG. 2.

Reference is now made to FIG. 7 which is a flow chart of one method to adapt the number of classes as referenced by step 250 (FIG. 2); however, other methods of class adaptation are possible. Operation starts at block 700. At step 710, K (the number of classes) is initialized to an appropriate value. In one embodiment, K may be initially set to one, in other embodiments K may be guessed to a conservative estimate. Next, at step 720 the main adaptation loop is performed at least a predetermined number of iterations to obtain parameters $\theta_k$ for each class. In step 720, it may be sufficient to stop before convergence, depending upon the data and the application.

After the parameters are obtained, at step 730 the class parameters are compared. At branch 740, if two or more classes are similar, operation branches to step 750 where similar classes are merged, and the class adaptation operation is complete as indicated at 760. However, returning to the branch 740, if two or more classes are not similar, then K is incremented and the parameters are initialized for the new class. The new parameters may be initialized to values similar to one of the other classes, but with small random values added. The operations 720 and 730 are repeated to adapt the class parameters for the new class number K, starting with the newly initialized class parameters and the previously learned class parameters. Then, at branch 740 the appropriate branch is taken, which either completes the operation or again increments the number of classes and repeats the loop.

5 Experimental Results and Implementations

Figure 8:
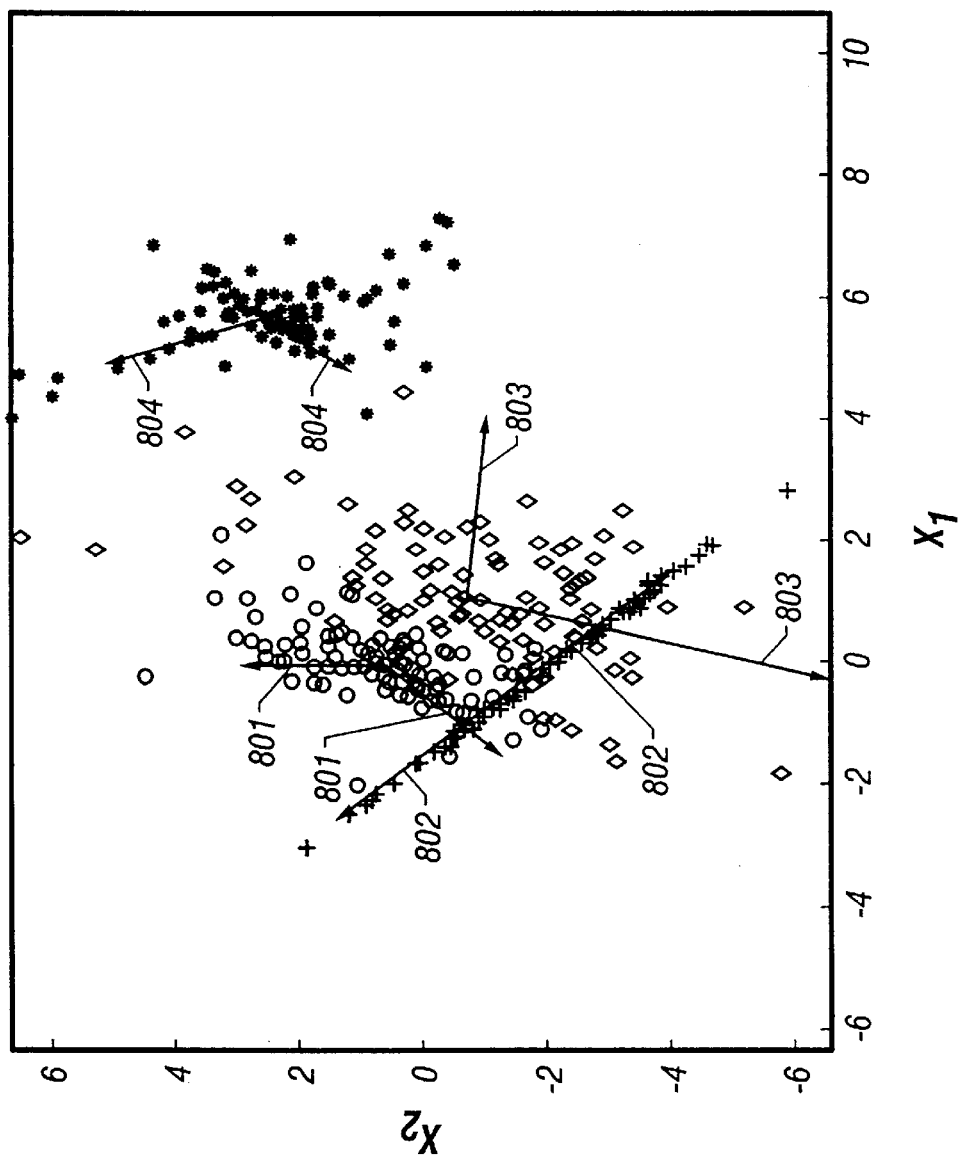
FIG. 8 is a graph that shows the results of an experiment to adapt and classify two-dimensional data.

Reference is now made to FIG. 8. In one experiment random data was generated from four different classes, and the algorithm described herein was used to learn the parameters and classify the data. The data points for the two classes in two-dimensional space were initially unlabeled. Each class was generated using random choices for the class parameters. Each data point represented a data vector of the form $x_t=(x_1, x_2)$. The goal for the algorithm was to learn the four mixing matrices and bias vectors given only the unlabeled two-dimensional data set.

In the experiment, the parameters were randomly initialized, and the algorithm described in FIG. 2, including the main adaptation loop was performed. The algorithm converged after about 300 iterations of the main adaptation loop, and in FIG. 8, the arrows 801, 802, 803, and 804 are indicative of the respective mixing matrices $A_1, A_2, A_1$, and $A_4$, and bias vectors $b_1, b_2, b_3$, and $b_4$. The arrows show that the parameters were learned correctly. In this experiment, the classes had several overlapping areas, and the classification error on the whole data set was calculated at about 5.5%. In comparison, the Gaussian mixture model used in the Autoclass algorithm gave an error of about 7.5%. The Autoclass algorithm is disclosed by Stutz and Cheeseman, "Autoclass—a Bayesian Approach to Classification" Maximum Entropy and Bayesian Methods, Kluwer Academic Publishers (1994). For the k-means clustering algorithm (i.e., Euclidean distance measure) the error was calculated at about 11.3%.

Reference is now made to FIGS. 9A, 9B, 9C, 9D, 9E, 9F, and 9G, which represents raw and processed data for a experiment in which two microphones were placed in a room to record a conversation between two persons with music in the background. The conversation between the two persons is in an alternating manner in which a first person talks while a second person listens (giving a first class), and then the second person talks while the other person listens (giving a second class). The time at which one speaker stops speaking and other begins speaking is unknown. The goal is to determine who is speaking, separate the speaker's voice from the background music and recover their conversation.

Figure 9A:
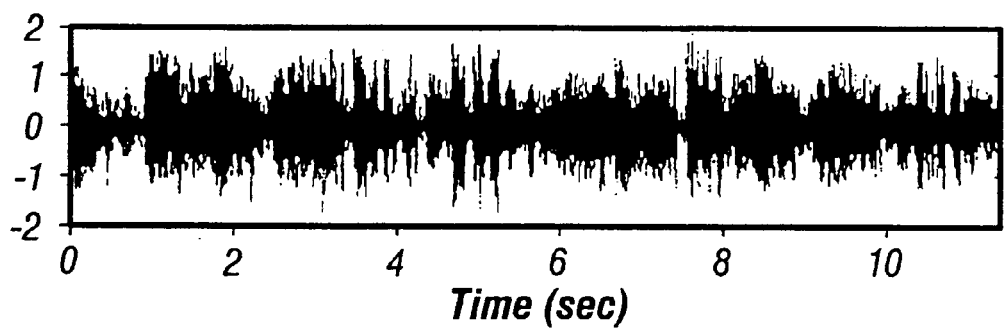
FIG. 9A is a graph of data collected over time from a first channel.
Figure 9B:
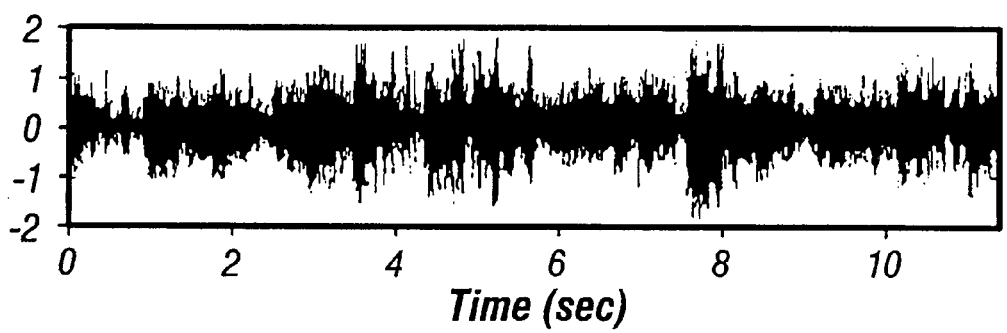
FIG. 9B is a graph of data collected over time from a second channel.

In FIG. 9A, the first microphone provides a first channel of raw mixed data designated x, and in FIG. 9B the second channel provides a second channel of raw data designated by $x_2$. Each channel receives the alternating voices of the first and second persons together with the background music. The horizontal axis shows time intervals (in seconds). In one experiment, the data included 11 seconds of data sampled at a rate of 8 kHz. The vertical axis shows amplitude about a reference value.

In this example there two classes (K=2). The adaptation algorithm described with reference to FIG. 2 was used to adapt two mixing matrices and two bias vectors to the two classes. A first mixing matrix $A_1$ and a first bias vector $b_1$ were randomly initialized and adapted to define the first class in which the first person's voice is combined with the background music, and a second mixing matrix $A_2$ and a second bias vector $b_2$ were randomly initialized and adapted to define the second class in which the second person's voice is combined with the background music. For each matrix adaptation step, a step size was computed as a function of the amplitude of the basis vectors in the mixing matrix and the number of iterations.

Figure 9C:
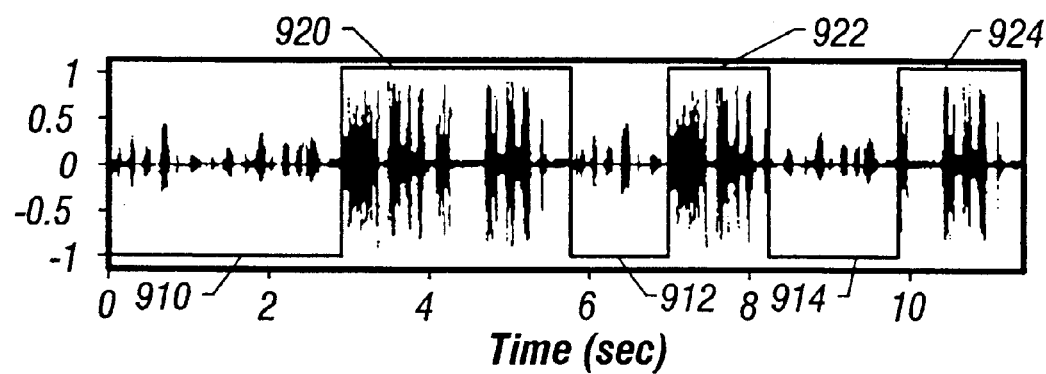
FIG. 9C is a graph of a first source (voices) after adapting the parameters, classifying the source vectors, and separating the sources.
Figure 9D:
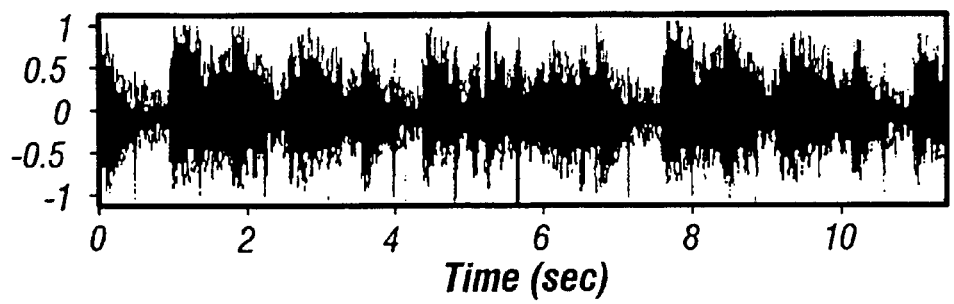
FIG. 9D is a graph of a second source (background music) after adapting the parameters, classifying the source vectors, and separating the sources.

FIGS. 9C and 9D show the source signals after adaptation, classification, and separation using a block size of 2000 samples to improve accuracy of the classification, as discussed below. FIG. 9C shows the time course of the two speech signals with markers that correctly indicate which speaker is talking. Particularly, the first speaker is speaking at time intervals 910, 912, and 914, and the second speaker is speaking at time intervals 920, 922, 924. FIG. 9D shows the time course of the background music.

Figure 9E:
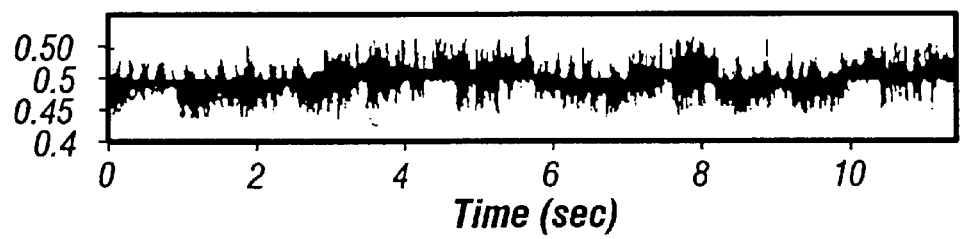
FIG. 9E is a graph of the class probability for single samples.
Figure 9F:
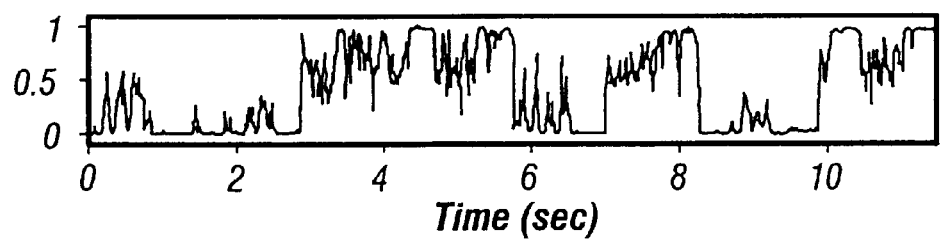
FIG. 9F is a graph of the class probability for samples in blocks of 100 adjacent samples.
Figure 9G:
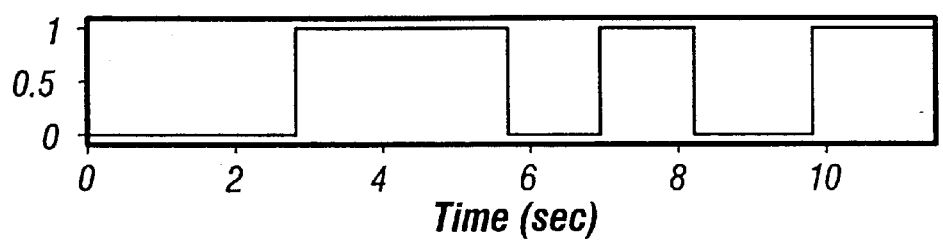
FIG. 9G is a graph of the class probability for samples in blocks of 2000 adjacent samples.

In this example, a single sample typically did not include enough information to unambiguously assign class membership. FIG. 9E shows the class conditional probability $p(C2|xt, \theta2)=1-p(C1|xt, \theta1)$. FIG. 9E shows many values clustered around 0.5, which indicates uncertainty about the class membership of the corresponding data vectors using a single sample. Using a threshold of 0.5 to determine the class membership for single samples as shown in FIG. 9E gives an error of about 27.4%. In order to improve accuracy of assignment to classes, the a proiri knowledge that a given class will likely persist over many samples was used. In some embodiments this a priori knowledge is incorporated into a complex temporal model for $p(Ck)$; however, in this experiment the simple procedure of computing the class membership probability for an n-sample block was used. FIG. 9F shows the results for a block size of 100 samples, which provided an error rate of only about 6.5%, thereby providing a much more accurate estimate of class membership. When a sample block size of 2000 was used, as shown in FIG. 9G, the error rate dropped to about 0.0%, and the class probabilities were recovered and matched those in FIG. 9C.

For this experiment, the SNR (Signal to Noise Ratio) with a block size of 100 samples was calculated to be 20.8 dB and 21.8 for classes 1 and 2, respectively. In comparison, a standard ICA algorithm using infomax, which was able to learn only one class, provided a SNR of only 8.3 dB and 6.5 dB, respectively.

Implementations

Figure 10:
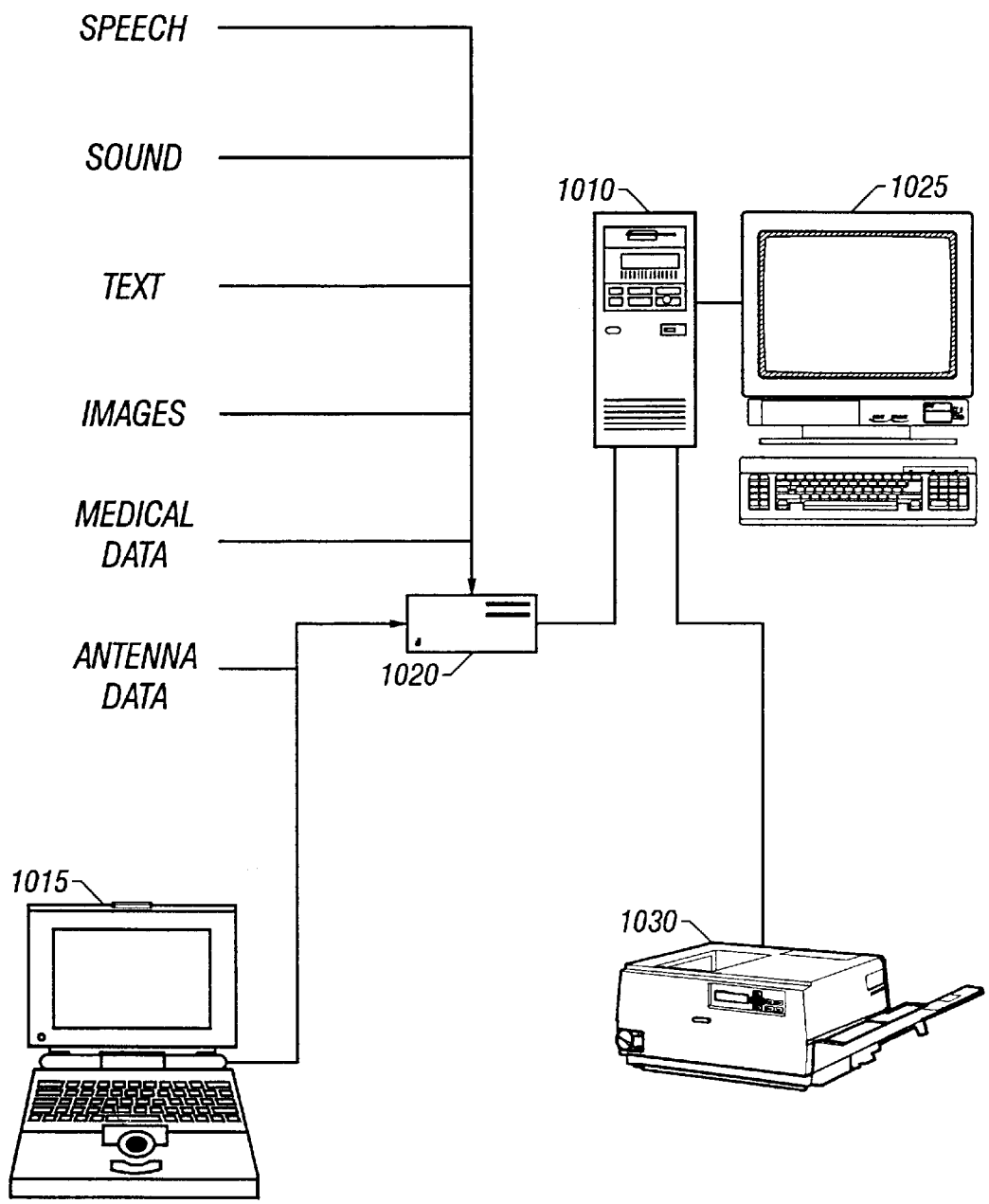
FIG. 10 is a diagram illustrating a variety of source data, a computer to process the data, and output devices.

Reference is now made to FIG. 10. Generally, the adaptation and classification algorithms described herein, such as the algorithm shown in FIG. 2, will be implemented in a computational device such as a general purpose computer 1010 that is suitable for the computational needs of the algorithm. In some embodiments it may be implemented in an ASIC (application specific integrated circuit) for reasons such as low-cost and/or higher processing speed. Due to the computational requirements of the algorithm, it may be advantageous to utilize a computer with a fast processor, lots of memory, and appropriate software.

The adaptation and classification algorithms described herein can be used in a wide variety of data processing applications, such as processing speech, sound, text, images, video, text, medical recordings, antenna receptions, and others. For purposes of illustration of the variety of data that can be adapted and classified by this algorithm, FIG. 10 shows that speech, sound, images, text, medical data, antenna data, and other source data may be input into the computer 1010. The text may be in computer-readable format, or it may be embedded in an image. The data may be generated by, or stored in another computer shown at 1015. Depending upon the sensor(s) used, the raw data may already have the form of digital data. If not, a digital sampler 1020 can be used to digitize analog data or otherwise to process it as necessary to form suitable digital data. The output from the computer can be used for any suitable purpose or displayed by any suitable system such as a monitor 1025 or a printer 1030.

The data set can be processed in a variety of ways that specifically depend upon the data set and the intended application. For purposes of description, data processing generally falls into two categories: 1) a first category in which unknown parameters for multiple classes are adapted from the data to find unknown structure in data, for example for separation of sources, and 2) a second category in which the unknown class parameters for multiple classes are adapted using a training set, and then the adapted class parameters for each class are used (and sometimes re-used) to find the certain or selected structure in the data. However, because the categories are chosen only for descriptive purposes, some uses may fall into both categories.

The first category, in which a mixing matrix is adapted from the data and then the sources are separated, is illustrated in the flow chart of FIG. 2 and is described with reference thereto. An example of this first category is speech enhancement, such as the microphone mixing example disclosed with reference to FIGS. 9A–9G, in which parameters for two classes are adapted for the purpose of classifying mixed data to separate two voices from the background music.

Another example of the first category is medical data processing. EEG (Electro-encephalography) recordings are generated by multiple sensors each of which provides mixed signals indicative of brain wave activity. A person's brain wave activity transitions through a number of different cycles, such as different sleep levels. In one embodiment the adaptation and classification algorithm of FIG. 2 could be used to adapt the class parameters for multiple classes, to classify the data, and to separate the sources. Such an implementation could be useful to monitor normal activity as well as to reject unwanted artifacts. An additional medical processing application is MRI (Magnetic Resonance Imaging), from which data can be adapted and classified as described in FIG. 2.

Still another example of the first category is antenna reception from an array of antennas, each operating as a sensor. The data from the each element of the array provides mixed signals that could be adapted, classified, and separated as in FIG. 2.

Figure 11:
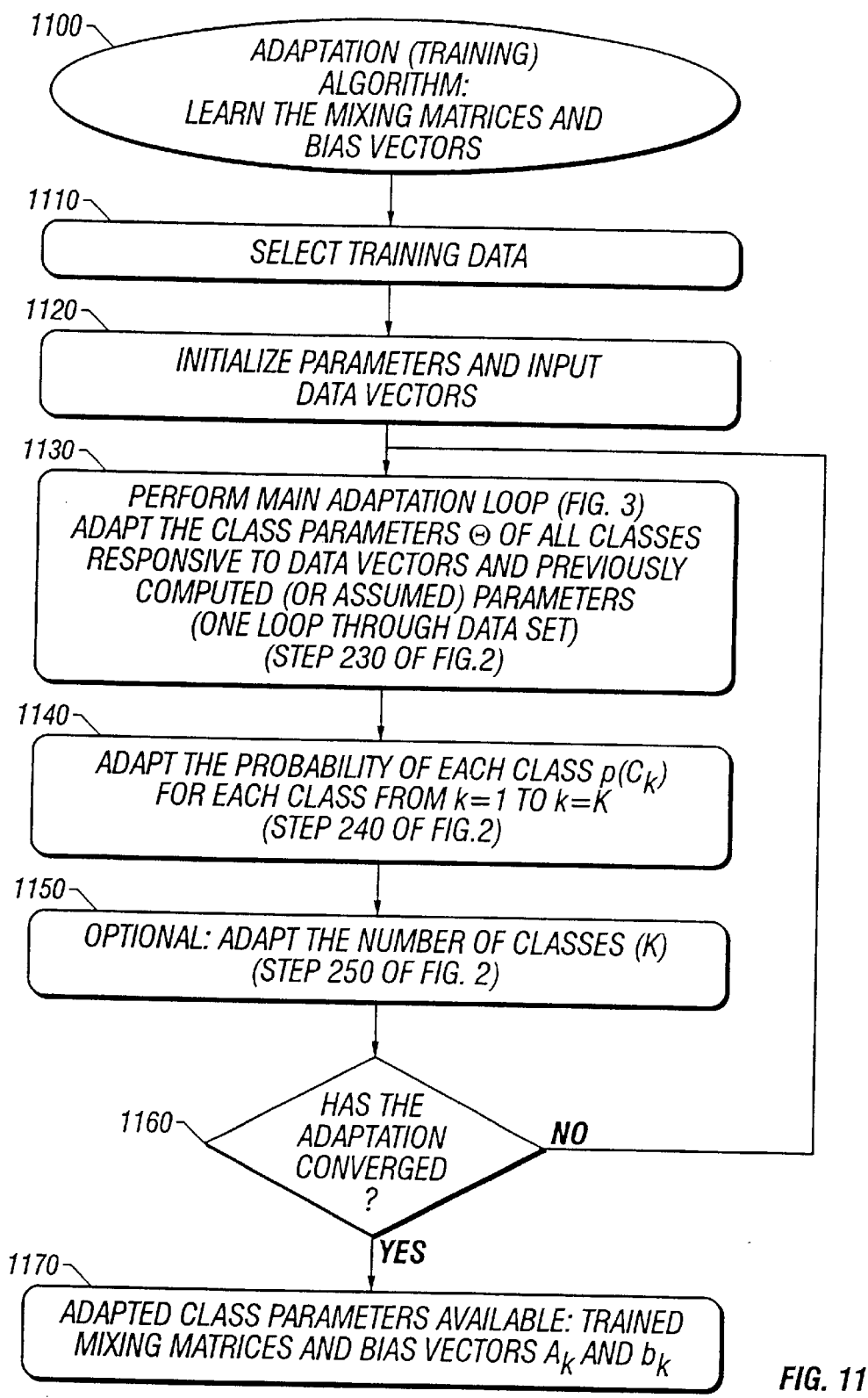
FIG. 11 is a flow chart of an adaptation (training) algorithm that learns the class parameters based upon a selected data set.
Figure 12:
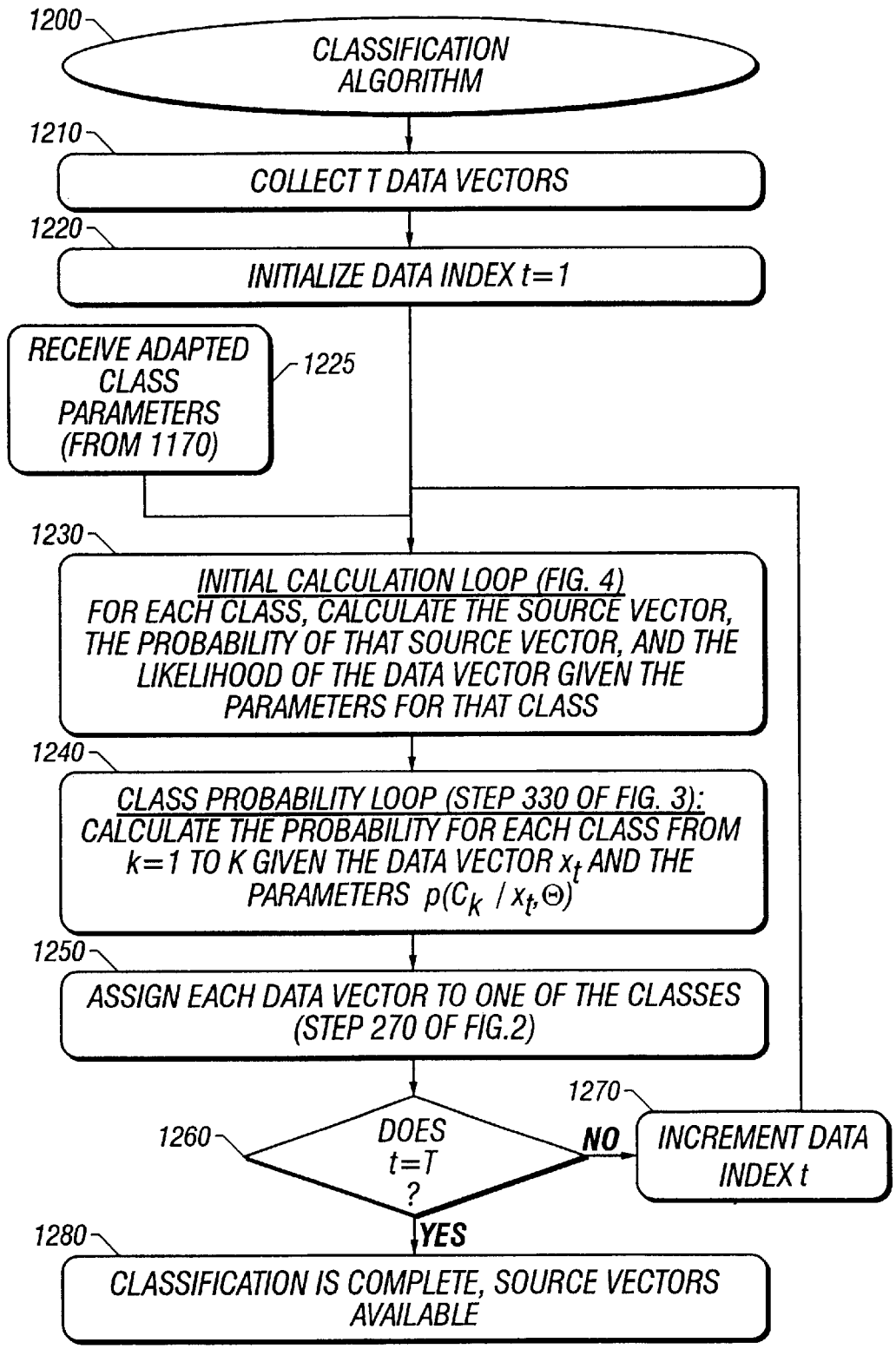
FIG. 12 is a flow chart of a classification algorithm that utilizes previously-adapted class parameters to classify a data set.

FIGS. 11 and 12 illustrate the second category of data processing in which the system is trained to learn mixing matrices, which are then used to classify data. FIG. 11 is a flow chart that shows the training algorithm beginning at 1100. At step 1110 the training data is selected; for example image data such as nature scenes and text can be selected to provide two different classes. At step 1120 the parameters are initialized and the training data vectors are input in a manner such as described with reference to steps 210 and 220 of FIG. 2. Steps 1130, 1140, 1150, and 1160 form a loop that corresponds to the steps 230, 240, 250, and 260 in FIG. 2, which are described in detail with reference thereto. Briefly, step 1130 is the main adaptation loop shown in FIG. 3 wherein the mixing matrices and bias vectors are adapted in one loop through the data set. Step 1140 is the step wherein the probability of each class is adapted from 1 to K. Step 1150 is the optional step wherein the number of classes may be adapted. At step 1160 the results of the previous iteration are evaluated and compared with previous iterations to determine if the algorithm has converged as described in more detail with reference to step 260 of to FIG. 2. After convergence, operation moves to block 1170 wherein the final classes Ak and bias vectors bk for each class from 1 to K are available.

FIG. 12 is a flow chart that shows the classification algorithm beginning at 1200. At step 1210 the data vectors in the data set are collected or retrieved from memory. At step 1220 the data index t is initialized to 1 to begin the loop that includes the steps 1230, 1240, 1250, and the decision 1260. At step 1225 the adapted class parameters (from step 1170) previously computed in FIG. 11 are inserted into the loop via step 1230. The step 1230 is the initial calculation loop shown in FIG. 4 and described with reference thereto, wherein using the previously-adapted class parameters, the source vector is calculated, the probability of the source vector is calculated, and the likelihood of the data vector given the parameters for that class is calculated. The step 1240 is step 330 of FIG. 4, wherein the class probability for each class is calculated. At step 1250 each data vector is assigned to one of the classes. Typically the class with the highest probability for that data vector is assigned or a priori knowledge can be used to group the data vectors and thereby provide greater accuracy of classification. As shown at 1260 and 1270, the loop is repeated for all the data vectors, until at 1280 classification is complete and additionally the source vectors, which have been computed in previous steps, are available if needed. The classified data can now be used as appropriate. In some instances, the classification information will be sufficient, in other instances the source vectors together with the classification will be useful.

In some embodiments, all the basis functions (i.e. the column vectors of the mixing matrix) will be used to classify the data in FIG. 12. In other embodiments, less than all of the basis vectors may be used. For example, if N=100, then the 30 basis vectors having the largest contribution could be selected to be used in calculations to computed the class probability.

One advantage of separating the adaptation algorithm from the classification process is to reduce the computational burden of the algorithm. The adaptation algorithm requires a huge number of computations in its many iterations to adapt the mixing matrices and bias vectors to the data. Furthermore, in some instances expert assistance may be required to properly adapt the data. However, once the class parameters have been learned, the classification algorithm is a straightforward calculation that consumes much less computational power (i.e. less time). Therefore, implementing a classification algorithm as in FIG. 12 using previously learned class parameters as in FIG. 11 is typically more practical and much less costly then implementing an complete adaptation and classification system such as shown in FIG. 2.

Figure 13:
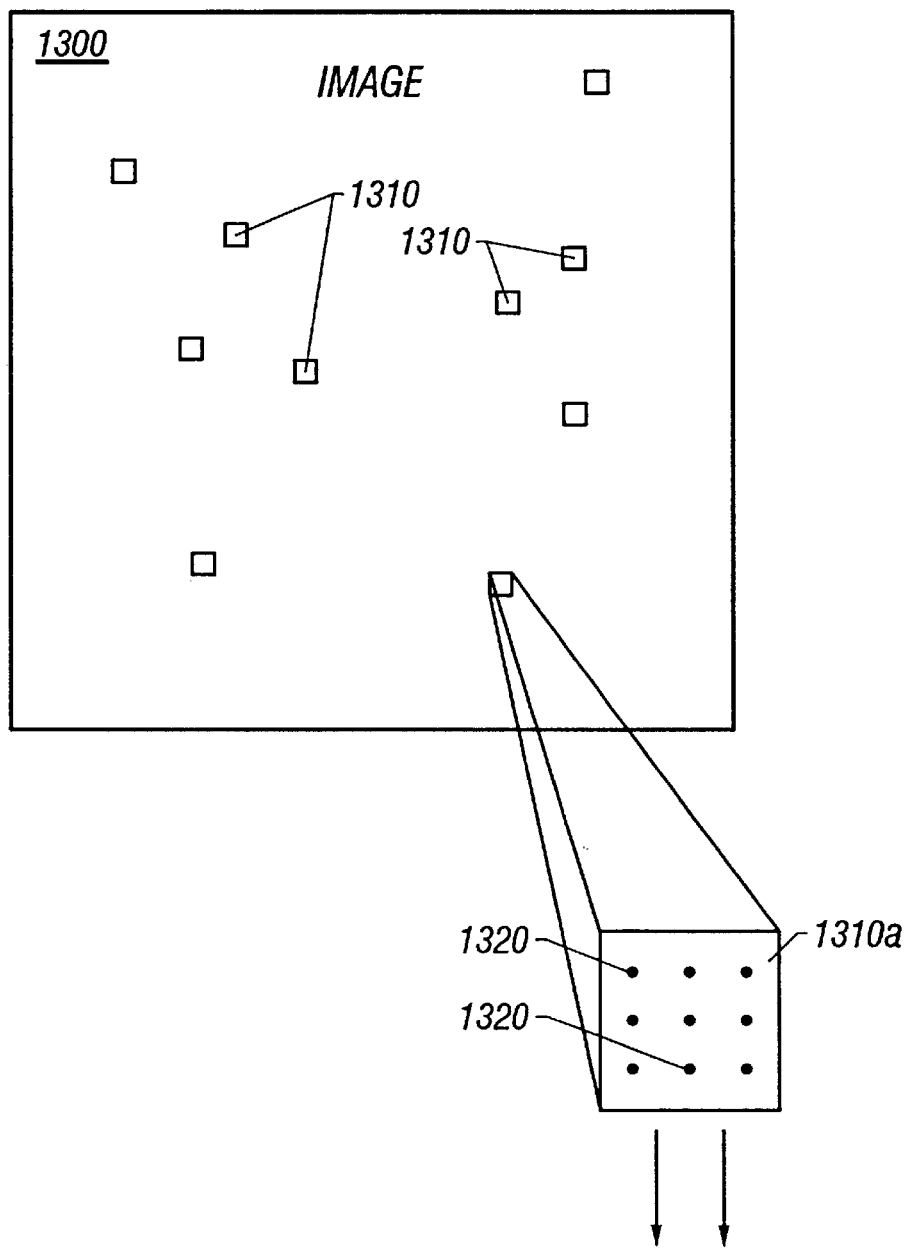
FIG. 13 is a diagram of an image, illustrating selection of patches and pixels within the patches that are used to construct a vector.

FIG. 13 is a diagram that illustrates encoding an image 1300 (shown in block form). The image is defined by a plurality of pixels arranged in rows and columns (e.g. 640×480), each pixel having digital data associated therewith such as intensity and/or color. The pixel data is supplied by a digital camera or any other suitable source of digital image data. A plurality of patches 1310 are selected from the image, each patch having a predefined pixel area, such as 8×8, 12×12, or 8×12. To illustrate how the data vectors are constructed from the image data, an expanded view of patch 1310a shows a 3×3 pixel grid. Each of the nine pixels within the 3×3 supplies one of the 9-elements of the data vector xt in a pre-defined order. Each of the patches likewise forms a data vector. Referring now to FIG. 11, the data vectors are used as training data at 1110 to adapt the mixing matrices and bias vectors to provide the class parameters, including the trained mixing matrices and bias vectors, as illustrated at 1170. The image is encoded by the adapted class parameters.

The selection process to determine which patches 1310 will be selected depends upon the embodiment. Generally, a sufficient number and type of patches should be selected with a sufficient pixel count to allow adequate adaptation of mixing matrices and bias vectors for each class of interest. In some cases the patches will be randomly selected, in other cases the patches will be selected based upon some criteria such as their content or location.

Image classification is, broadly speaking, the process of encoding an image and classifying features in the image. The class parameters may be learned from a particular image, as in segmentation described below, or they may be learned from a training set that is adapted from certain selected classes of interest. For example text and nature images may be encoded to provide parameters for the two classes of nature and text. Using the learned parameters, the classification algorithm (FIG. 12) is then performed to classify the image data.

In order to collect the data for the classification process (step 1210 of FIG. 12) a blockwise classification may be performed in which the image is divided into a grid of contiguous blocks, each having a size equal to the patch size. Alternatively, in a pixelwise classification a series of overlapping blocks are classified, each block being separated by one pixel. The pixelwise classification will typically be more accurate than the blockwise classification, at the expense of additional computational time.

Segmentation is a process in which an image is processed for the purpose of finding structure (e.g. objects) that may not be readily apparent. To perform segmentation of an image, a large number of patches are selected randomly from the image and then used as training data at step 1110 (FIG. 11) in the adaptation (training) algorithm of FIG. 11, in order to learn multiple class parameters and thereby encode the image. Using the learned parameters, the classification algorithm (FIG. 12) is then performed to classify the image data. The classified image data can be utilized to locate areas that have similar structure. The classified data vectors may be further processed as appropriate or desired.

Figure 14:
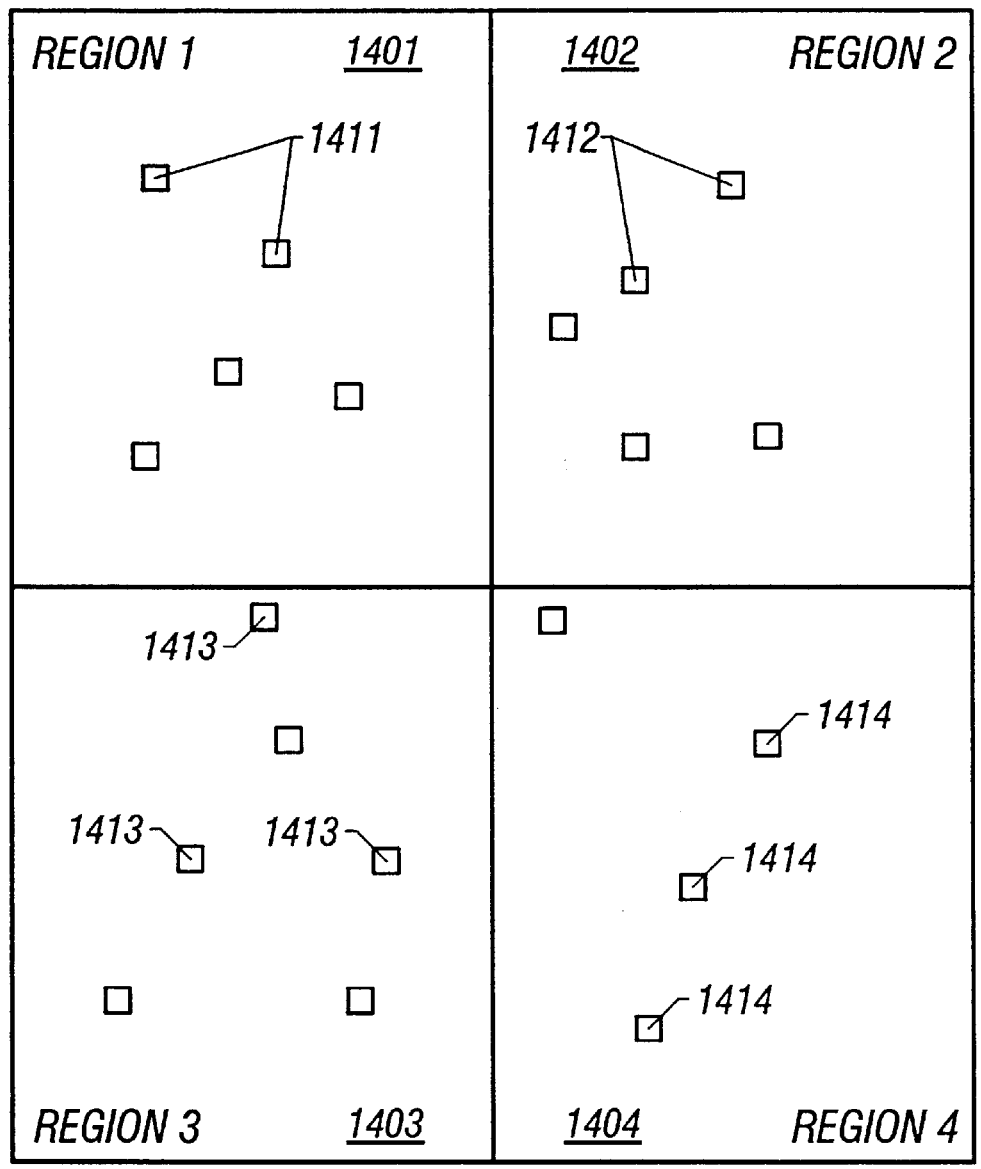
FIG. 14 is a diagram of four image regions, each region having different features that are used to adapt the class parameters for four classes.

Other image classification processes may be employed for image recognition, in which an image is processed to search for certain previously learned classes. Reference is now made to FIG. 14, which is a view of an image that has been selectively divided into four distinct regions 1401, 1402, 1403, and 1404, each region having features different from the other three regions. Four different images could also be used, each image providing one of the regions. For example four different types of fabric may be sampled, each region being a single type of fabric distinct from the others. A number of random samples are taken from each of the four regions, sufficient to characterize the distinct features within each region. In some embodiments the samples may be taken randomly from the entire image including the four regions, or from each of the four regions separately. However, if the regions are known, then it may be advantageous to sample patches from selected areas. In one example, a first group of samples 1411 are taken from the first region, a second group of samples 1412 are taken from the second region, a third group of samples 1413 are taken from the third region, and a fourth group of samples 1414 are taken from the fourth region. The samples are then used in the adaptation algorithm of FIG. 11 to adapt (learn) parameters for four classes, each of the four classes corresponding to the features of the four regions. If the classification is known in advance, the four classes may be adapted separately in four single-class adaptation processes.

The adapted parameters can then be used in the classification algorithm of FIG. 12 to classify regions within images that comprise an unknown combination of the four regions. One use is for locating and classifying bar codes that are placed arbitrarily upon a box. Four class parameters can be adapted (learned) in FIG. 11, including three classes corresponding to three different types of bar codes and a fourth class corresponding the typical features of the surrounding areas (noise). The adapted parameters for the four classes are then used in the classification algorithm of FIG. 12. The classified data and its corresponding data index provides the location and type of each bar code. Using this information, the bar code can then be read with a bar code reader suitable for that class, and the information in the bar code can be used as appropriate.

Image compression can be described using the steps described in FIGS. 11 and 12. The adaptation algorithm of FIG. 11 is first utilized to learn class parameters. In some embodiments, the class parameters are optimized, but in other embodiments, the class parameters may be learned using the particular image to be compressed. For standardized image systems, it is useful to optimize class parameters and provide the optimized parameters to both the person compressing of the image and the receiver of the compressed image. Such systems can have wide application; for example the JPEG compression system in wide use on the Internet utilizes an optimized algorithm that is known to the sender and the receiver of the compressed image.

Figure 15:
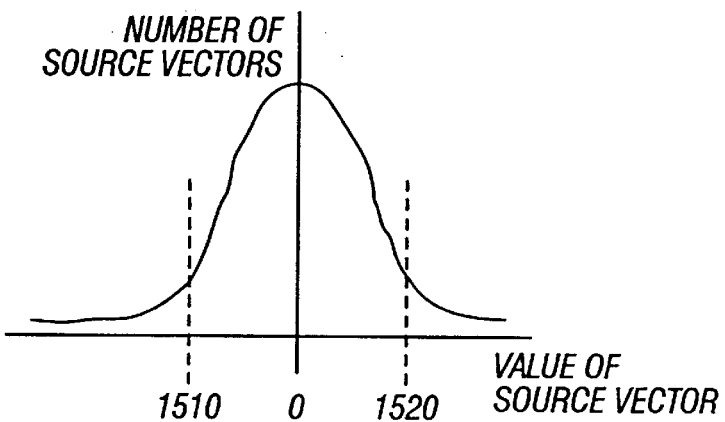
FIG. 15 is a graph of the number of source vectors as a function of their value, illustrating that values of the source vectors are clustered around zero.

Referring to FIG. 12, the image to be compressed is classified using the appropriate class parameters. The source vectors, which have been computed in FIG. 12, typically are clustered around zero, as shown in FIG. 15. Because the source vectors that are near zero contain little information, they may be discarded. In other words, the source vectors between an upper value 1510 and a lower value 1520 may be discarded. The upper and lower values are selected dependent upon the implementation, taking into account such factors as how much information is desired to be transmitted and the bandwidth available to transmit the image data. The compressed image data includes all source vectors above the upper value 1510 and below the lower value 1520 and the data index of the corresponding data vector in the image, together with information about the class to which each source vector belongs and the class parameters.

Other image processing applications include image enhancement, which includes de-noising and processes for reconstructing images with missing data. To enhance an image, the calculated source vectors are transformed into a distribution that has an expected shape. One such algorithm is disclosed by Lewicki and Sejnowski, "Learning Nonlinear Overcomplete Representations for Efficient Coding", Proceedings of Advances in Neural Information Processing Systems 10, (1998) MIT Press, Cambridge Mass., pp. 556–562. Briefly, each image patch is assumed to be a linear combination of the basis functions plus additive noise: xt=AkSk+n. The goal is to infer the class probability of the image patch as well as to infer the source vectors for each class that generate the image. The source vector sk can be inferred by maximizing the conditional probability density for each class:
EMBED Equation.3 or $$\hat{s}_k = \min_s \left[ \frac{\lambda_k}{2} |x_t - A_k s_k|^2 + \alpha_k^T |s_k| \right]$$

where $\alpha_k$ is the width of the Laplacian pdf and $\lambda_k = 1/\sigma_{k,n}^2$ is the precision of the noise for each class. The image is then reconstructed using the newly computed source vectors.

A combination of image processing methods may be used for some implementations. For example satellite data processing may use image classification to look for certain structures such as mountains or weather patterns. Other embodiments may use segmentation to look for structure not readily apparent. Also, the satellite data processing system may use image enhancement techniques to reduce noise in the image.

Speech processing is an area in which the mixture algorithms described herein have many applications. Speech enhancement, which is one speech processing application, has been described above with reference to FIG. 8. Other applications include speech recognition, speaker identification, speech/sound classification, and speech compression.

Figure 16:
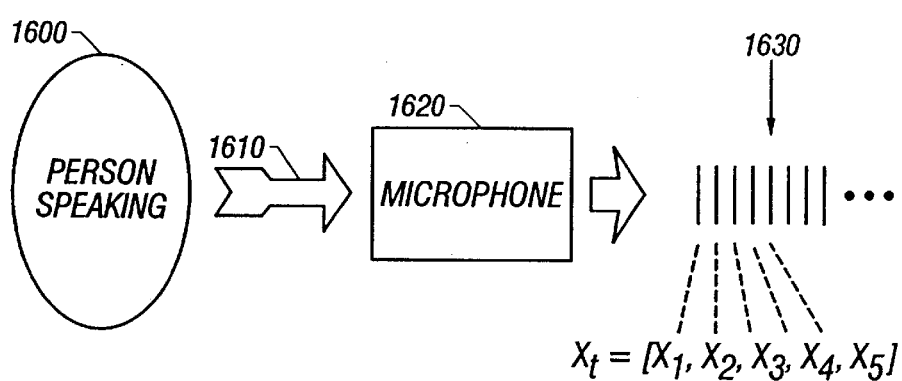
FIG. 16 is a diagram of data collection from a single person and a single microphone.

FIG. 16 shows one system for digitizing and organizing speech data into a plurality of data vectors. A speaker 1600 generates sound waves 1610 that are received by a microphone 1620. The output from the microphone is digital data 1630 that is sampled a predetermined sampling rate such as 8 kHz. The digital data 1630 includes a series of samples over time, which are organized into data vectors. For example 100 sequential samples may provide the data elements for one data vector $x_t$. Other embodiments may use longer data vectors, for example 500 or 1000 sample elements. In some embodiments the data vectors are defined in a series of contiguous blocks, one after the other. In other embodiments the data vectors may be defined in an overlapping manner; for example a first data vector includes samples 1 to 500, a second data vector includes samples 250 to 750, and so forth.

A speech recognition system first utilizes the adaptation (training) algorithm of FIG. 11 to adapt class parameters to selected words (or phonics), for the purpose of each word (or phonic) being a different class. For example, the adaptation algorithm may be trained with a word (or phonic) spoken in a number of different ways. The resulting class parameters are then used in the classification algorithm of FIG. 12 to classify speech data from an arbitrary speaker. Once the speech has been classified, the corresponding class provides the word that is recognized by the system. The word can then be saved as text in a computer, for example.

Speech and sound classification systems utilize the adaptation (training) algorithm of FIG. 11 to adapt class parameters to selected features of speech or sound. For example, a language classification system adapts class parameters using the adaptation algorithm of FIG. 12 to distinguish between languages, for example, in such a manner that one language is represented by a first class and a second language is represented by another. The adapted class parameters are then used in the classification algorithm of FIG. 12 to classify speech data by language.

A speaker identification system adapts the class parameters to distinguish between the speech of person and the speech of another. The adapted class parameters are then used in the classification algorithm to identify speech data and associate it with the speaker.

A musical feature classification system adapts the class parameters to recognize a musical feature, for example to distinguish between musical instruments or combinations of musical instruments. The adapted class parameters are then used to classify musical data.

Speech compression is similar to image compression described above. A speech compression system uses adapted class parameters to classify speech data. Typically a speech compression system would use class parameters that are highly optimized for the particular type speech; however some embodiments may adapt the class parameters to the particular speech data. The speech data is classified as in FIG. 11 using the adapted class parameters. The source vectors corresponding to the speech data, which have been computed during classification, are typically clustered around zero as shown in FIG. 15. Because the source vectors that are near zero contain little information, they may be discarded. In other words, the source vectors between an upper value 1510 and a lower value 1520 may be discarded. The upper and lower values are selected dependent upon the implementation, taking into account such factors as how much information is desired to be transmitted and the available bandwidth. The compressed speech data includes all source vectors above the upper value 1510 and below the lower value 1520 and an identification of the time position of the corresponding data vector, together with information about the class to which each source vector belongs and the class parameters.

It will be appreciated by those skilled in the art, in view of these teachings, that alternative embodiments may be implemented without deviating from the spirit or scope of the invention. For example, the system could be implemented in an information retrieval system in which the class parameters have been adapted to search for certain types of information or documents, such as books about nature, books about people and so forth. Also, in some embodiments some of the basis functions (less than all) can be selected from the adapted mixing matrix and used to classify data. This invention is to be limited only by the following claims, which include all such embodiments and modifications when viewed in conjunction with the above specification and accompanying drawings.

What is claimed is:

1. A system for separating an independent source signal from a mixture of source signals, comprising:
   a plurality of sensors configured to receive said mixture of source signals;
   a processor configured to take samples of said mixture of source signals over time and store each sample as a data vector to create a data set;
   a first function configured to assign each data vector within said data set to one class within a plurality of classes based on its similarity to other data vectors in said one class; and
   an independent component analysis module configured to perform an independent component analysis of the data vectors assigned to said one class to separate an independent source signal from other signals in said mixture of source signals.

2. The system of claim 1, wherein said plurality of sensors comprises a plurality of microphones and said mixture of source signals comprises a mixture of sounds.

3. The system of claim 1, wherein said system comprises an image processing system, and said mixture of source signals comprises a mixture of images.

4. The system of claim 1, wherein said system comprises a medical data processing system and said mixture of source signals comprises a mixture of medical data signals.

5. The system of claim 1, wherein said system comprises a speech compression system and said independent source signal comprises a voice signal.

6. The system of claim 1, wherein said system comprises a speech recognition system and said independent source signal comprises a voice signal.

7. The system of claim 1, wherein said first function is configured to generate class parameters for each data vector and for each class within said plurality of classes.

8. The system of claim 7, wherein said first function is configured to assign a data vector to said one class by comparing the class parameters of said data vector to the class parameters of said class.

9. The system of claim 8, wherein said first function is configured to create a new class if the class parameters of said data vector do not match the class parameter of any class in said plurality of classes.

10. A system for separating an individual feature of an image from a mixture of features in the image, comprising:
    a processor configured to take samples of said image, wherein said samples are stored to a memory as image data vectors;
    a first function configured to assign each image data vector to one class within a plurality of classes based on its similarity to other image data vectors in said one class; and
    an independent component analysis module configured to perform an independent component analysis of the image data vectors assigned to said one class to separate an individual image feature from other features in said image.

11. The system of claim 10, wherein said samples of said image comprises a set of image pixels.

12. The system of claim 10, wherein said first function is configured to generate class parameters for each image data vector and for each class within said plurality of classes.

13. The system of claim 12, wherein said first function is configured to assign an image data vector to said one class by comparing the class parameters of said image data vector to the class parameters of said class.

14. The system of claim 13, wherein said first function is configured to create a new class if the class parameters of said image data vector do not match the class parameter of any class in said plurality of classes.

15. The system of claim 10, comprising a memory configured to store predetermined class parameters for said plurality of classes.

16. The system of claim 15, wherein the first function is configured to assign an image data vector to said one class by comparing the class parameters of said image data vector to the predetermined class parameters.

17. The system of claim 10, wherein said image is a digital image and said individual feature is a bar code.

18. The system of claim 10, wherein said image comprises image data and text data and said individual feature comprises said text data.

19. The system of claim 10, wherein said image comprises image data and noise data, and said individual feature comprises said image data.

20. A method for separating an independent source signal from a mixture of source signals, comprising:
    receiving mixture of source signals from a plurality of sensors;
    taking samples of said mixture of source signals over time;
    storing said samples as a data set, wherein each of said samples comprises a data vector within said data set;
    assigning each data vector within said data set to one class within a plurality of classes based on its similarity to other data vectors in said one class; and
    performing independent component analysis of the data vectors assigned to said one class to separate an independent source signal from other signals in said mixture of source signals.

21. The method of claim 20, wherein said plurality of sensors comprises a plurality of microphones and said mixture of source signals comprises a mixture of sounds.

22. The method of claim 20, wherein said mixture of source signals comprises a mixture of image signals.

23. The method of claim 20, wherein said mixture of source signals comprises a mixture of medical data signals.

24. The method of claim 20, wherein said independent source signal comprises a voice signal.

25. The method of claim 20, wherein said assigning each data vector to one class comprises generating class parameters for each data vector and for each class within said plurality of classes.

26. A memory comprising instructions that when run perform a method comprising:

receiving mixture of source signals from a plurality of sensors;

taking samples of said mixture of source signals over time;

storing said samples as a data set, wherein each of said samples comprises a data vector within said data set;

assigning each data vector within said data set to one class within a plurality of classes based on its similarity to other data vectors in said one class; and performing independent component analysis of the data vectors assigned to said one class to separate an independent source signal from other signals in said mixture of source signals.

27. The memory of claim 26, wherein said plurality of sensors comprises a plurality of microphones and said mixture of source signals comprises a mixture of sounds.

28. The memory of claim 26, wherein said mixture of source signals comprises a mixture of image signals.

29. The memory of claim 26, wherein said mixture of source signals comprises a mixture of medical data signals.

30. The memory of claim 26, wherein said independent source signal comprises a voice signal.

31. The memory of claim 26, wherein said assigning each data vector to one class comprises generating class parameters for each data vector and for each class within said plurality of classes.

* * * * *